United States Patent
Yukizaki

(10) Patent No.: US 11,627,446 B2
(45) Date of Patent: Apr. 11, 2023

(54) INTER-VEHICLE COMMUNICATION SYSTEM AND VEHICLE COMMUNICATION DEVICE

(71) Applicant: DENSO CORPORATION, Kariya (JP)

(72) Inventor: Yasumune Yukizaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 185 days.

(21) Appl. No.: 17/120,999

(22) Filed: Dec. 14, 2020

(65) Prior Publication Data

US 2021/0099850 A1  Apr. 1, 2021

Related U.S. Application Data

(63) Continuation of application No. PCT/JP2019/020007, filed on May 21, 2019.

(30) Foreign Application Priority Data

Jun. 25, 2018 (JP) .............................. JP2018-119985

(51) Int. Cl.
   *H04W 4/46* (2018.01)
   *H04W 4/70* (2018.01)
   (Continued)

(52) U.S. Cl.
   CPC ............... *H04W 4/46* (2018.02); *H04W 4/70* (2018.02); *H04W 84/042* (2013.01); *H04W 88/005* (2013.01)

(58) Field of Classification Search
   None
   See application file for complete search history.

(56) References Cited

U.S. PATENT DOCUMENTS 9,554,415 B1* 1/2017 Ho ...................... H04B 1/3822
2018/0020332 A1* 1/2018 Kumabe ............... H04W 88/02
(Continued)

FOREIGN PATENT DOCUMENTS

| JP | 2011087174 A | 4/2011 |
| JP | 2017142749 A | 8/2017 |
| JP | 2017175211 A | 9/2017 |

*Primary Examiner* — Alex Skripnikov
*Assistant Examiner* — Pamit Kaur
(74) *Attorney, Agent, or Firm* — Harness, Dickey & Pierce, P.L.C.

(57) ABSTRACT

An inter-vehicle communication system includes: multiple vehicle communication devices for multiple vehicles; and a wireless base station. Each of the multiple vehicle communication devices includes a wide area communication portion that communicates with a different device, a wide area communication control portion that executes a wide area periodic transmission process of multicasting a vehicle information packet towards a different vehicle, a narrow area communication portion, and a narrow area communication control portion that executes a narrow area periodic transmission process of multicasting the vehicle information packet towards the different vehicle. The wide area communication control portion transmits a vehicle status report to the wireless base station. The wide area communication control portion pauses the wide area periodic transmission process. The wireless base station includes an in-cell vehicle management portion that manages position information of a vehicle existing in a charge cell, an encounter determination portion that determines whether a transmission source vehicle has a possibility of encountering the different vehicle, and a device control portion that instructs a transmission source device to pause the wide area periodic transmission process.

15 Claims, 10 Drawing Sheets

(51) Int. Cl.
*H04W 84/04* (2009.01)
*H04W 88/00* (2009.01)

(56) References Cited

U.S. PATENT DOCUMENTS

| | | |
|---|---|---|
| 2019/0080603 A1 | 3/2019 | Yukizaki et al. |
| 2020/0053527 A1* | 2/2020 | Nylander ................ H04W 4/40 |
| 2020/0388163 A1* | 12/2020 | Zhang ..................... G08G 1/22 |

* cited by examiner

FIG. 5
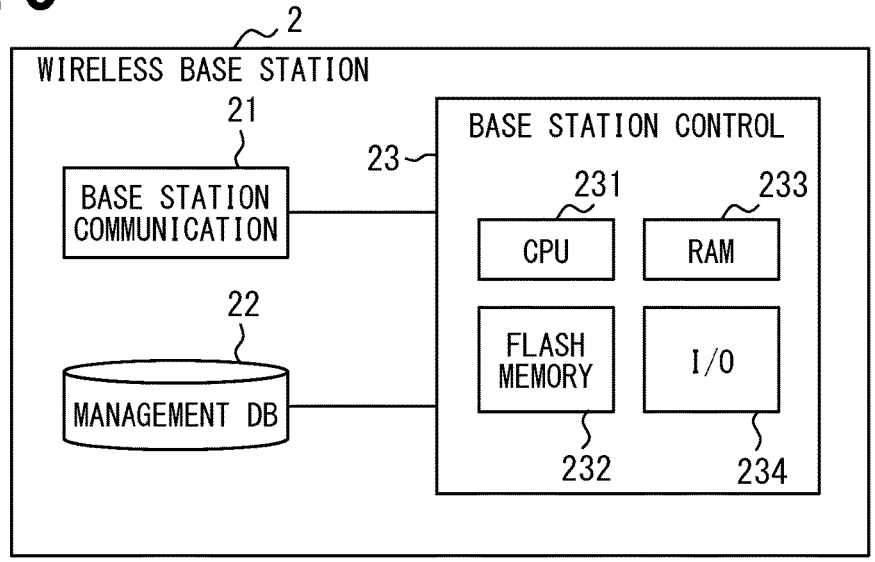
FIG. 6
| DEVICE ID | RECEPTION TIME POINT | POSITION | ADVANCING DIRECTION | WIDE AREA DIRECT COMMUNI- CATION QUALITY | NARROW AREA COMMUNI- CATION QUALITY | WIDE AREA PERIODIC TRANSMISSION EXECUTION SITUATION | NARROW AREA PERIODIC TRANSMISSION EXECUTION SITUATION |
|---|---|---|---|---|---|---|---|
| 101 | ... | ... | ... | 1 | 3 | EXECUTING | PAUSING |
| 102 | ... | ... | ... | 3 | 3 | EXECUTING | EXECUTING |
| 103 | ... | ... | ... | 2 | 2 | PAUSING | EXECUTING |
| ... | ... | ... | ... | ... | | | |
FIG. 7
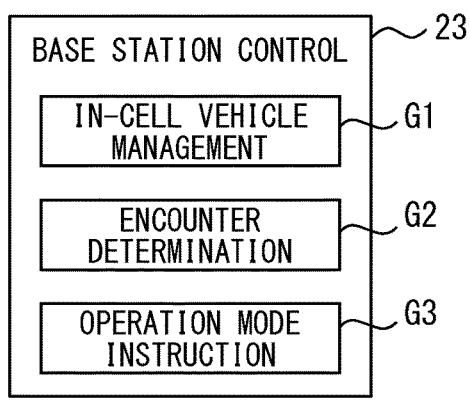

FIG. 14

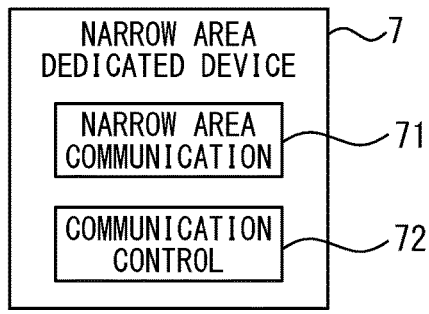

FIG. 15

| ENVIRONMENT AROUND TRANSMISSION SOURCE DEVICE | | | PERIODIC TRANSMISSION MEASURE OF VEHICLE INFORMATION |
|---|---|---|---|
| THERE IS NO POSSIBILITY OF ENCOUNTERING DIFFERENT VEHICLE | | | NO COMMUNICATION (NOT TRANSMIT) |
| THERE IS POSSIBILITY OF ENCOUNTERING DIFFERENT VEHICLE | COMMUNICATION QUALITY OF NARROW AREA COMMUNICATION IS GOOD | | NARROW AREA COMMUNICATION |
| | COMMUNICATION QUALITY OF WIDE AREA COMMUNICATION IS GOOD | THERE IS NO NARROW AREA DEDICATED DEVICE | WIDE AREA DIRECT COMMUNICATION |
| | | THERE IS NARROW AREA DEDICATED DEVICE | WIDE AREA DIRECT COMMUNICATION AND NARROW AREA COMMUNICATION |
| | COMMUNICATION QUALITIES OF WIDE AREA COMMUNICATION AND NARROW AREA COMMUNICATION ARE BAD | THERE IS NO NARROW AREA DEDICATED DEVICE | INDIRECT INTER-VEHICLE COMMUNICATION |
| | | THERE IS NARROW AREA DEDICATED DEVICE | BOTH OF INDIRECT INTER-VEHICLE COMMUNICATION AND NARROW AREA COMMUNICATION |

INTER-VEHICLE COMMUNICATION SYSTEM AND VEHICLE COMMUNICATION DEVICE

CROSS REFERENCE TO RELATED APPLICATIONS

The present application is a continuation application of International Patent Application No. PCT/JP2019/020007 filed on May 21, 2019, which designated the U.S. and claims the benefit of priority from Japanese Patent Application No. 2018-119985 filed on Jun. 25, 2018. The entire disclosures of all of the above applications are incorporated herein by reference.

TECHNICAL FIELD

The present disclosure relates to an inter-vehicle communication system in which a vehicle communication device that is a communication device used in a vehicle wirelessly communicates with a different vehicle communication device under a control of a wireless base station, and the vehicle communication device that provides the vehicle communication system.

BACKGROUND

An inter-vehicle communication system has been proposed. In the inter-vehicle communication system, each of multiple vehicles sequentially multicasts a communication packet (hereinafter, a vehicle information packet) indicating vehicle information such as a current position, a traveling speed, an advancing direction, or the like and sequentially receives the vehicle information transmitted from the different vehicle. Such an inter-vehicle communication system is implemented by mounting a communication device (hereinafter, vehicle communication device) for wirelessly communicating with the different device directly in each of the multiple vehicles. The multicasting means, for example, transmitting similar vehicle information packets to multiple vehicles.

SUMMARY

An inter-vehicle communication system may include: multiple vehicle communication devices for multiple vehicles; and a wireless base station. Each of the multiple vehicle communication devices may include a wide area communication portion that may communicate with a different device, a wide area communication control portion that may execute a wide area periodic transmission process of multicasting a vehicle information packet towards a different vehicle, a narrow area communication portion, and a narrow area communication control portion that may execute a narrow area periodic transmission process of multicasting the vehicle information packet towards the different vehicle. The wide area communication control portion may transmit a vehicle status report to the wireless base station. The wide area communication control portion may pause the wide area periodic transmission process. The wireless base station may include an in-cell vehicle management portion that manages position information of a vehicle existing in a charge cell, an encounter determination portion that may determine whether a transmission source vehicle has a possibility of encountering the different vehicle, and a device control portion that may instruct a transmission source device to pause the wide area periodic transmission process.

BRIEF DESCRIPTION OF THE DRAWINGS

The above and other features and advantages of the present disclosure will be more clearly understood from the following detailed description with reference to the accompanying drawings. In the accompanying drawings.

FIG. 5 is a block diagram showing a configuration of a wireless base station;

FIG. 6 is a diagram showing one example of storage data of a management database;

FIG. 7 is a block diagram illustrating a function of a base station controller;

FIG. 14 is a diagram illustrating a function of a narrow area dedicated device; and FIG. 15 is one example of a control aspect of the vehicle communication device by the wireless base station according to a fourth modification.

DETAILED DESCRIPTION

Figure 1:
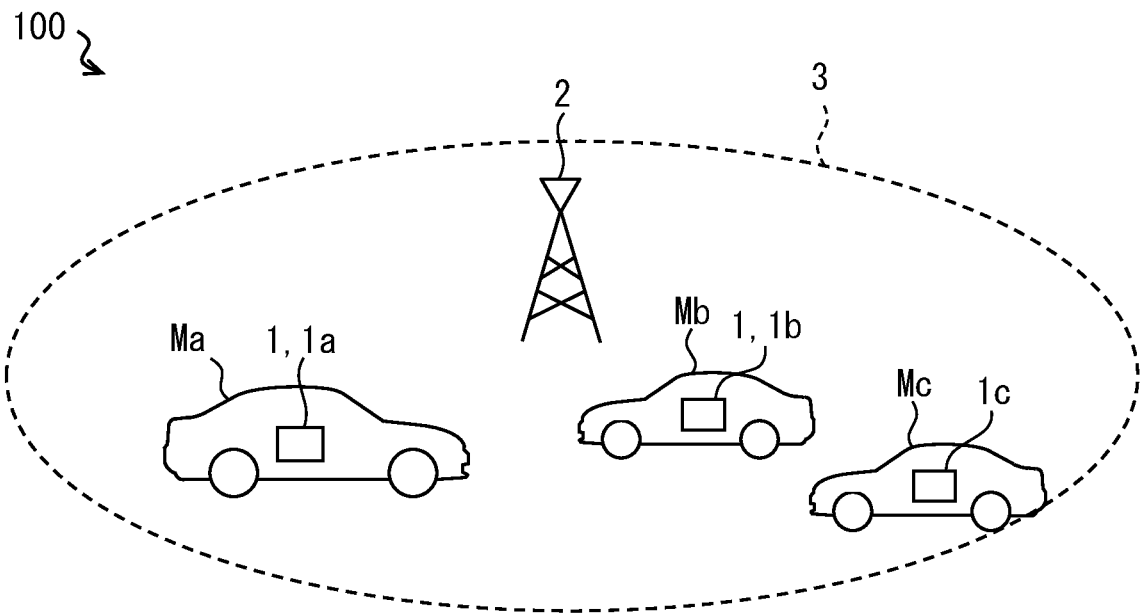
FIG. 1 is a diagram showing an overall configuration of an inter-vehicle communication system according to a first embodiment.

In a comparative example, a vehicle communication device includes both of a narrow area communication portion for directly performing inter-vehicle communication with a different vehicle existing around an own vehicle and a wide area communication portion for indirectly communicating (hereinafter, performing indirect inter-vehicle communication) with the different vehicle via a wireless base station. The wireless base station is a base station that provides a wide area communication network (in other words, a mobile network) provided by a telecommunications carrier, such as a mobile phone network. The narrow area communication portion has a configuration that wirelessly communicates with the different vehicle existing within several hundred meters. The wide area communication portion has a configuration that complies with a wide area wireless communication standard such as, for example, LTE (Long Term Evolution), 4G, or 5G and wirelessly communicates with the wireless base station.

Standardization of a cellular V2X technology is being studied. In the cellular V2X technology, the vehicle communication device directly and wirelessly communicates with the different vehicle, a pedestrian, or the like with a communication method compliant with the wide area wireless communication standard. The "V" of the V2X refers to an automobile. The "X" refers to a pedestrian, a different vehicle, a road equipment, a network, or the like. The cellular V2X technology corresponds to, in other words, a technology for performing wireless communication without a wireless base station (that is, directly) by using a communication method similar to a communication method in a case where communication devices such as the vehicle communication device, a smartphone, and the like communicate with the wireless base station. The inter-vehicle communication by the cellular V2X technology is performed in accordance with a wide area wireless communication standard. Therefore, the communication range is relatively wider than an inter-vehicle communication under consideration.

As a configuration of the vehicle communication device, a configuration including both of a wide area communication portion and a narrow area communication portion that are capable of performing the cellular V2X communication in order to improve an inter-vehicle communication reliability is assumed. In the assumed configuration, each of two communication modules of the wide area communication portion and the narrow area communication portion sequentially transmit vehicle information. Therefore, as compared with a configuration including only the narrow area communication portion, there is a difficulty of heat generation and a difficulty of current consumption increase.

One example of the present disclosure provides an inter-vehicle communication system and a vehicle communication device capable of suppressing heat generation and current consumption in the vehicle communication device.

According to one example embodiment, an inter-vehicle communication system includes multiple vehicle communication devices for multiple vehicles and a wireless base station that provides a communication service complying with a predetermined wide area wireless communication standard. Each of the multiple vehicle communication devices includes a vehicle information acquisition portion that sequentially acquires vehicle information that is information indicating a traveling situation of an own vehicle that is a vehicle including at least one of the multiple vehicle communication devices and includes a current position information, a wide area communication portion that is a communication module for performing wireless communication complying with the wide area wireless communication standard and directly or indirectly communicates with a different device or communicate with the different device, a wide area communication control portion that controls an operation of the wide area communication portion and executes a wide area periodic transmission process that is a process of periodically multicasting a vehicle information packet that is a communication packet indicating the vehicle information towards a different vehicle existing around the own vehicle in cooperation with the wide area communication portion, a narrow area communication portion performs a narrow area communication that is a wireless communication complying with a predetermined communication method different from the wide area wireless communication standard, and a narrow area communication control portion that controls an operation of the narrow area communication portion and executes a narrow area periodic transmission process that is a process of periodically multicasting the vehicle information packet towards the different vehicle existing around the own vehicle in cooperation with the narrow area communication portion. The wide area communication control portion includes a report process portion that sequentially transmits a vehicle status report to the wireless base station in cooperation with the wide area communication portion. The vehicle status report is a signal indicating own vehicle position information acquired by the vehicle information acquisition portion. The wide area communication control portion pauses the wide area periodic transmission process based on an instruction from the wireless base station. The wireless base station includes a base station communication portion that receives the vehicle status report transmitted from the plurality of vehicle communication devices, an in-cell vehicle management portion that manages position information of a vehicle existing in a charge cell that is an area where the wireless base station provides the communication service, based on the vehicle status report received by the base station communication portion, an encounter determination portion that determines whether a transmission source vehicle as a vehicle using a vehicle communication device transmitting the vehicle status report has a possibility of encountering the different vehicle based on the position information that is managed by the in-cell vehicle management portion and position information of the vehicle existing in the charge cell when the vehicle status report is received, and a device control portion that instructs a transmission source device as the plurality of vehicle communication devices for the transmission source vehicle to pause the wide area periodic transmission process when the encounter determination portion determines that the transmission source vehicle does not have the possibility of encountering the different vehicle.

According to one example embodiment, the wireless base station unifies management of the information of the vehicle existing in the charge cell, and causes the vehicle communication device that is used in the vehicle and has no possibility of encountering the different vehicle to pause a wide area periodic transmission process. Thereby, it may be possible to reduce the consumption electric power and the heat generation of the vehicle communication device since a driving amount of the wide area communication portion and the load on the communication controller are reduced.

The vehicle communication device is a vehicle communication device used in the inter-vehicle communication system, and includes a vehicle information acquisition portion that sequentially acquires vehicle information that is information indicating a traveling situation of the vehicle and includes a current position information, a wide area communication portion that is a communication module for performing wireless communication complying with a predetermined wide area wireless communication standard and directly or indirectly provides a communication service complying with the predetermined wireless communication standard with a different device via a wireless base station, a wide area communication control portion that controls an operation of the wide area communication portion and executes a wide area periodic transmission process that is a process of periodically multicasting a vehicle information packet that is a communication packet indicating the vehicle information towards a different vehicle existing around an own vehicle in cooperation with the wide area communication portion, a narrow area communication portion that performs a narrow area communication that is a wireless communication complying with a predetermined communication method different from the predetermined wide area wireless communication standard, and a narrow area communication control portion that controls an operation of the narrow area communication portion and executes a narrow area periodic transmission process that is a process of periodically multicasting the vehicle information packet towards the different vehicle existing around the own vehicle in cooperation with the narrow area communication portion. The wide area communication control portion includes a report process portion that sequentially transmits a vehicle status report to the wireless base station in cooperation with the wide area communication portion. The vehicle status report is a signal indicating own vehicle position information acquired by the vehicle information acquisition portion. The wide area communication control portion pauses the wide area periodic transmission process based on an instruction from the wireless base station. According to the vehicle communication device, when there is no possibility of encountering the different vehicle based on the instruction from the wireless base station, the wide area periodic transmission process is paused. Therefore, it may be possible to suppress the heat generation and the current consumption.

First Embodiment

A first embodiment of the present disclosure will be described with reference to the drawings. FIG. 1 is a diagram showing one example of a schematic configuration of an inter-vehicle communication system 100 according to the present disclosure. As shown in FIG. 1, the inter-vehicle communication system 100 includes multiple vehicle communication devices 1 that are mounted and used in multiple vehicles Ma, Mb, and Mc and a wireless base station 2.

In FIG. 1, for convenience, as the vehicle (hereinafter, also referred to as a mounted vehicle) including the vehicle communication device 1, only three vehicles Ma, Mb, and Mc are shown. However, actually, in the overall system, four vehicles or more may exist. Hereinafter, where the vehicle communication devices 1 mounted in the vehicles Ma, Mb, and Mc are distinguished, the vehicle communication devices 1 are described as vehicle communication devices 1a, 1b, and 1c. The vehicle communication device 1a is the vehicle communication device 1 mounted in the vehicle Ma. The vehicle communication device 1b is the vehicle communication device 1 mounted in the vehicle Mb. The vehicle communication device 1c is the vehicle communication device 1 mounted in the vehicle Mc.

The inter-vehicle communication system 100 is a system for the mounted vehicles to perform wireless communication (so-called inter-vehicle communication) with each other. Each of the mounted vehicles is a vehicle traveling on the road. Each of the mounted vehicles may be a four-wheel automobile, a two-wheel automobile, a three-wheel automobile, or the like. The two-wheel vehicle includes a motorcycle. As one example of the present embodiment, the vehicles Ma, Mb, and Mc are the four-wheel vehicles.

The wireless base station 2 is a device that provides a communication service complying with a predetermined wide area wireless communication standard. As the wide area wireless communication standard, for example, various standards such as LTE, 4G, and 5G can be adopted. The wide area wireless communication standard corresponds a communication standard that provides a communication distance (in other words, transmission distance) of 1 kilometer or more. Here, as one example, the wireless base station 2 provides a communication service complying with the 4G standard. The vehicle communication device 1 can perform bidirectional wireless communication complying with the wide area wireless communication standard with the wireless base station 2.

The wireless base station 2 is arranged in each geographical section (so-called cell 3) appropriately set by the telecommunications carrier. For example, the wireless base station 2 covers an area having a radius of about several kilometers as one cell 3. That is, the wireless base station 2 is a wireless base station that provides a cellular mobile communication system. The wireless base station 2 may cover an area (that is, a microcell) having a radius of several hundred meters like a PHS base station. The size of the cell 3 in charge of the wireless base station 2 can be appropriately changed.

From another viewpoint, the wireless base station 2 is a device for a user equipment (that is, UE) to wirelessly access a wide area communication network. The wide area communication network herein corresponds to a public communication network such as a mobile phone network or the internet provided by a telecommunications carrier. The UE is a device that uses the communication service provided by the wireless base station 2. From another viewpoint, the UE is a communication device capable of performing the wireless communication complying with the predetermined wide area wireless communication standard with the wireless base station 2. For example, the UE may be a smartphone, a tablet terminal, a roadside machine, or the like. In the present embodiment, the vehicle communication device 1 also corresponds to the UE. The wireless base station 2 communicates with UE existing in the cell (charge cell) 3 in charge of the wireless base station 2, and allocates a transmission opportunity (that is, performing scheduling) to the UE, or the like.

Each vehicle communication device 1 can wirelessly communicate with the different vehicle communication device 1 (in other words, the different vehicle), a different device such as the smartphone without the wireless base station 2 (that is, directly) with use of the communication method similar to the communication method for communicating with the wireless base station 2. For convenience, the direct wireless communication that complies with the wide area wireless communication standard and is performed with the different device is referred to as wide area direct communication. In particular, the wide area direct communication with the different vehicle is referred to as a wide area inter-vehicle communication.

Each vehicle communication device 1 can wirelessly communicate with the different vehicle (substantially, different vehicle communication device 1), the roadside machine, or the like by the communication standard (hereinafter, narrow area communication standard) of which communication distance is limited to about several hundred meters. The narrow area communication standard is a predetermined standard different from the wide area wireless communication standard described above. A frequency used for the communication, a modulation method, or the like (that is, communication method) is different from that of the wide area direct communication. For convenience, a direct wireless communication with the different device in accordance with the narrow area communication standard is referred to as the narrow communication. The narrow communication with the different vehicle is described as a narrow area inter-vehicle communication.

Any narrow area communication standard can be adopted. Here, in one example, each vehicle complies with a WAVE (Wireless Access in Vehicular Environment) standard disclosed in IEEE1609 or the like and performs the narrow area inter-vehicle communication. As the narrow area communication standard, a DSRC (Dedicated Short Range Communications) standard or the like can be adopted.

Each mounted vehicle periodically multicasts a communication packet indicating the own vehicle information by the narrow area inter-vehicle communication and the wide area inter-vehicle communication. The vehicle information includes transmission source information indicating the vehicle (that is, transmission source vehicle) that has transmitted the communication packet, a generation time point of the data, a current position of the transmission source vehicle, an advancing direction, a traveling speed, an acceleration, and the like. The transmission source information is identification information (that is, vehicle ID) allocated to the transmission source vehicle in advance in order to distinguish the transmission source vehicle from the different mounted vehicle.

Hereinafter, for convenience, the communication packet including the vehicle information transmitted by the narrow area inter-vehicle communication is also described as a narrow area vehicle information packet. The communication packet including the vehicle information transmitted by the wide area inter-vehicle communication is also described as a wide area vehicle information packet. However, when the wide area vehicle information packet and the narrow area vehicle information packet are not distinguished from each other, the information packets are simply described as a vehicle information packet.

(Configuration of Vehicle Communication Device)

A configuration of the vehicle communication device 1 will be described by taking the vehicle communication device 1a mounted in the vehicle Ma for an example. The vehicle communication device 1 of the different mounted vehicle (for example, the vehicle Mb) has the similar configuration. For convenience, the mounted vehicle (that is, the vehicle Ma) in which the vehicle communication device 1 is mounted is also described as the own vehicle in order to distinguish the own vehicle from the vehicle in which the different vehicle communication device 1 is mounted.

Figure 2:
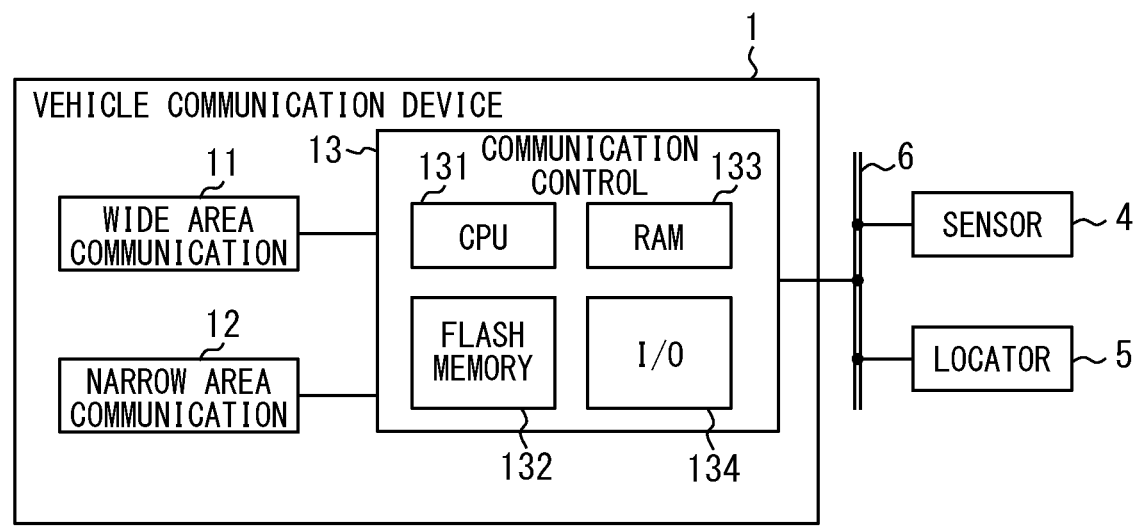
FIG. 2 is a block diagram showing a configuration of a vehicle communication device.

The vehicle communication device 1 is a unit for transmitting the vehicle information to a surrounding vehicle and receiving the vehicle information packet from the surrounding vehicle. As shown in FIG. 2, the vehicle communication device 1 includes a narrow area communication portion 12, a wide area communication portion 11, and a communication controller 13 as more detailed elements. Each of the narrow area communication portion 12 and the wide area communication portion 11 is connected to the communication controller 13, and can communicate with the communication controller 13. As shown in FIG. 2, the vehicle communication device 1 is connected to a sensor 4 mounted in the own vehicle and a locator 5, and can perform bidirectional communication or unidirectional communication with the sensor 4 and the locator 5 via a communication network 6 constructed in the vehicle.

The sensor 4 is various sensors for detecting various state quantities related to the traveling of the own vehicle. The state quantities related to the traveling of the own vehicle are, for example, a traveling speed, a yaw rate, a steering angle, an acceleration, a shift position, and the like. That is, the sensor 4 includes a speed sensor detecting the traveling speed, a yaw rate sensor detecting the yaw rate, a steering angle sensor detecting the steering angle, an acceleration sensor detecting the acceleration acting on the vehicle Ma, a shift position sensor, and the like. The state quantities related to the traveling of the vehicle also include the position information indicating the current position of the own vehicle specified by the locator 5.

The detection result of the sensor 4 is sequentially provided to the vehicle communication device 1 via the communication network 6. The detection results of the various sensors 4 may be provided to the vehicle communication device 1 via an arbitrary electronic control unit (ECU) or the like. The sensor corresponding to the sensor 4 is not limited to those described above. Also, it is not necessary to include all the sensors described above. The type of the sensor 4 may be appropriately designed.

The locator 5 is a device that sequentially calculates (in other words, specifies) the position of the own vehicle. For example, the locator 5 includes a GNSS receiver that receives a positioning signal transmitted by a positioning satellite configuring a GNSS (Global Navigation Satellite System), and calculates the position signal based on the positioning signal received by the GNSS receiver.

The locator 5 may determine the position based on a combination of the positioning result of the GNSS receiver and the measurement result of a gyro sensor, a vehicle speed sensor, or the like. The locator 5 may correct the position by executing a process (that is, a map matching process) of overlapping a locus of the decided position with a road shape indicated by map data. The position information indicating the current position sequentially identified by the locator 5 is sequentially provided to the vehicle communication device 1. The locator 5 may have the function described above. When a navigation device is mounted in the own vehicle, the navigation device may be used as the locator 5. The locator 5 may be built in the vehicle communication device 1.

The wide area communication portion 11 is a communication module that complies with the wide area wireless communication standard and is used for performing the wireless communication with a different device such as the wireless base station 2 or the different vehicle. The wide area communication portion 11 provides a function (hereinafter, wide area direct communication function) of performing the wide area direct communication with the different device. This wide area communication portion 11 includes a wide area communication antenna and a wide area communication transmission reception portion (not shown) as more detailed elements.

The wide area communication antenna is an antenna for transmitting and receiving the electric wave of a predetermined frequency band defined by the wide area wireless communication standard. The wide area communication transmission reception portion demodulates the signal received by the wide area communication antenna and provides the demodulated signal to the communication controller 13. The wide area communication transmission reception portion modulates data input from the communication controller 13, outputs the modulated data, and performs wireless transmission. The wide area communication antenna and the wide area communication transmission reception portion operate in cooperation. Thereby, the wide area communication portion 11 outputs the received data to the communication controller 13, modulates the data input from the communication controller 13, and transmits the modulated data to the wireless base station 2 or the like.

The narrow area communication portion 12 is a communication module that complies with a predetermined narrow area wireless communication standard (here, WAVE) and is used for wirelessly communicating with the different vehicle or the roadside machine directly. That is, the narrow area communication portion 12 provides a function (hereinafter, narrow area communication function) of performing the narrow area communication. The narrow area communication portion 12 includes a narrow area communication antenna and a narrow area communication transmission reception portion (not shown) as detailed elements.

The narrow area communication antenna is an antenna for transmitting and receiving the electric wave of the frequency band used for the narrow area communication. The frequency band used for the narrow area communication may be appropriately selected in accordance with the law of a region where the vehicle communication device 1 is used. For example, the narrow area communication may be implemented by using the electric wave in 760 MHz. In addition, the narrow area communication may be implemented by using the electric waves in 2.4 GHz, 5.9 GHz, or the like.

The narrow area communication transmission reception portion demodulates the signal received by the narrow area communication antenna and provides the demodulated signal to the communication controller 13. The narrow area communication transmission reception portion modulates data input from the communication controller 13, output the modulated data to the narrow area communication antenna, and performs wireless transmission. The narrow area communication portion 12 can communicate with the different device existing within an area having a radius of several hundred meters around the own device. The access control of the narrow area communication is performed by CSMA/CA (Carrier Sense Multiple Access/Collision Avoidance). An access control process based on the CSMA/CA may be handled by the narrow area communication transmission reception portion or the communication controller 13. The narrow area communication portion 12 may implement the wireless communication with the different vehicle by a communication method different from the wide area communication portion 11. The different communication method means that the modulation method or the frequency band of the electric wave for the communication is different.

The communication controller 13 controls operations of the narrow area communication portion 12 and the wide area communication portion 11. The communication controller 13 is configured as a computer including a CPU 131, a flash memory 132, a RAM 133, an I/O 134, and a bus line connecting these components. The flash memory 132 is a rewritable nonvolatile storage medium. The communication controller 13 may be implemented by using a GPU or MPU instead of the CPU 131. Further, the combination controller 131 may be implemented by a combination of the CPU 131, the GPU, and the MPU.

The flash memory 132 is a nonvolatile and rewritable memory. The flash memory 132 stores a program (hereinafter, communication control program) for causing a computer to function as the communication controller 13 or the like. As the specific storage medium of the communication control program, various non-transitory tangible storage mediums can be adopted. The execution of the communication control program by the CPU 131 corresponds to the execution of the method corresponding to the communication control program. The flash memory 132 stores the vehicle ID of the own vehicle.

The communication controller 13 acquires information (hereinafter, vehicle information) indicating a traveling situation of the own vehicle from the sensor 4 and causes the wide area communication portion 11 or the narrow area communication portion 12 to transmit the vehicle information packet that is a communication packet indicating the vehicle information. The communication controller 13 acquires the vehicle information packet transmitted from the different vehicle via the wide area communication portion 11 and the narrow area communication portion 12. Details of the function of the communication controller 13 will be described below.

(Function of Vehicle Communication Device)

Figure 3:
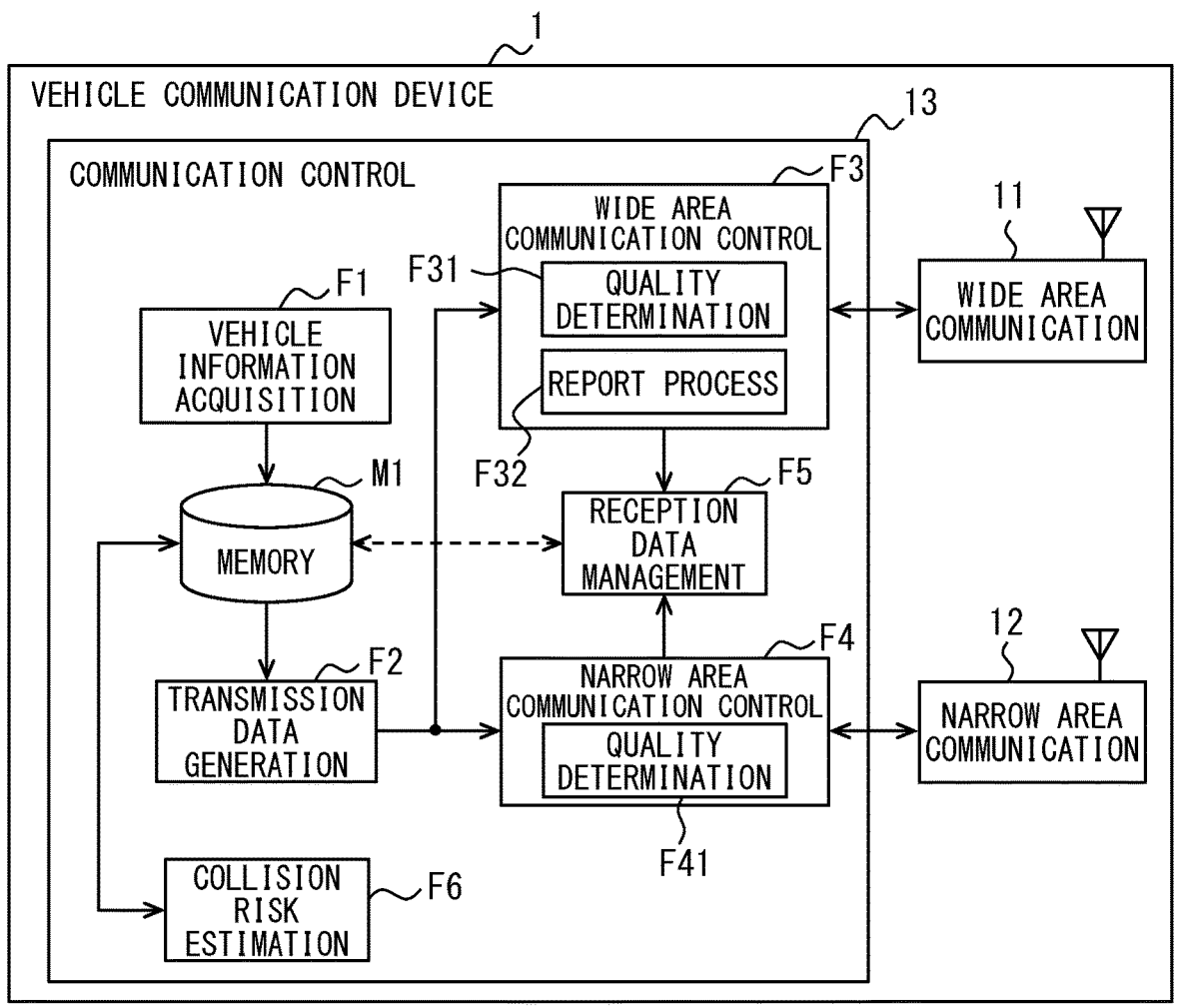
FIG. 3 is a block diagram illustrating a function of a communication controller.

The vehicle communication device 1 will be described. The CPU 131 executes the communication control program stored in the flash memory 132, and thereby the communication controller 13 provides various functions shown in FIG. 3. That is, the communication controller 13 includes a vehicle information acquisition portion F1, a transmission data generation portion F2, a wide area communication control portion F3, a narrow area communication control portion F4, a reception data management portion F5, and a collision risk estimation portion F6 as functional blocks. The communication controller 13 includes a memory M1 implemented by a rewritable storage medium such as the RAM 133.

Some or all of the functional blocks of the communication controller 13 may be implemented as hardware. An aspect implementing a certain function as the hardware includes an aspect that implements the function by using one or multiple ICs or the like. In addition, some or all of the functional blocks of the communication controller 13 may be implemented by a combination of software executed by the CPU and a hardware member.

The vehicle information acquisition portion F1 acquires various information (that is, the vehicle information) indicating the traveling state of the own vehicle from the sensor 4 and the locator 5 via the communication network 6. Specifically, the current position of the own vehicle, the traveling speed, the yaw rate, the advancing direction, or the like is acquired. The various information acquired by the vehicle information acquisition portion F1 is stored in the memory M1 for a certain period.

At a predetermined generation cycle, the transmission data generation portion F2 generates the transmission vehicle information indicating the traveling state of the vehicle at the time of generation at a predetermined generation cycle based on the various information stored in the memory M1. The generation cycle may be, for example, 100 milliseconds. Transmission vehicle information generated by the transmission data generation portion F2 corresponds to a data body part (so-called payload) accommodated in the vehicle information packet. The transmission vehicle information generated by the transmission data generation portion F2 is stored in the memory M1, and provided to the wide area communication control portion F3 and the narrow area communication control portion F4.

In one embodiment of the present embodiment, the transmission data generation portion F2 voluntarily generates the vehicle information at the predetermined generation cycle and provides the vehicle information to the wide area communication control portion F3 and the narrow area communication control portion F4. However, the operation aspect of the transmission data generation portion F2 is not limited to this. As another aspect, the transmission data generation portion F2 may generate the vehicle information packet based on a request from the wide area communication control portion F3 or the narrow area communication control portion F4.

The wide area communication control portion F3 controls an operation of the wide area communication portion 11. The wide area communication control portion F3 transmits the data to the wireless base station 2 and receive the data from the wireless base station 2 in cooperation with the wide area communication portion 11. The wide area communication control portion F3 indirectly transmits the data to the different UE such as the different vehicle and receives the data from the different UE via the wireless base station 2. Further, the wide area communication control portion F3 directly transmits the data to the different device such as the different vehicle and receives the data from the different device without the wireless base station 2 in cooperation with the wide area communication portion 11.

The operation of the wide area communication control portion F3 is controlled by an instruction of the wireless base station 2. The wide area communication control portion F3 executes a process (hereinafter, wide area periodic transmission process) of periodically multicasting the vehicle information packet by the wide area direct communication at the predetermined transmission cycle based on the instruction of the wireless base station 2, for example. One transmission of the vehicle information packet is implemented by outputting the communication packet (that is, wide area vehicle information packet) including the transmission vehicle information generated by the transmission data generation portion F2 to the wide area communication portion 11 and causing the wide area communication portion 11 to perform the wireless transmission. The wide area vehicle information packet transmitted from the wide area communication portion 11 is received by the different vehicle existing around the own vehicle without the wireless base station 2 (that is, as the wide area inter-vehicle communication). The execution state (that is, execution/pause) of the wide area periodic transmission process by the wide area communication control portion F3 is switched by the control signal from the wireless base station 2. For convenience, as the operation mode of the wide area communication control portion F3, a state where the wide area periodic transmission process is executed is also referred to as a periodic transmission mode. A state where the wide area periodic transmission process is paused is also referred to as a transmission pause mode.

The wide area communication control portion F3 acquires the wide area vehicle information packet received by the wide area communication portion 11 from the different vehicle. The wide area communication control portion F3 provides the vehicle information indicated by the acquired wide area vehicle information packet to the reception data management portion F5. The vehicle information of the different vehicle acquired by the wide area communication control portion F3 may be provided to various ECUs via the communication network 6.

The wide area communication control portion F3 includes a quality determination portion F31 and a report process portion F32 as sub functions. The quality determination portion F31 determines a quality (hereinafter, a wide area direct communication quality) of the wide area direct communication in the area around the own vehicle based on a reception situation of a wireless signal at the wide area communication portion 11. Here, the area around the own vehicle corresponds a range (for example, 1 kilometer) assumed as a range where the wide area direct communication can be performed. The wide area direct communication quality can be determined based on a predetermined index value indicating a communication quality such as a reception electric power of the wide area vehicle information packet transmitted from the different vehicle, a signal-to-noise ratio (so-called SN ratio), a packet loss rate, or a carrier congestion degree. The packet loss rate corresponds to a reception failure rate of data per fixed time. The carrier congestion degree corresponds to a usage rate of the electric wave (carrier) used for the wide area direct communication.

For example, the wide area communication control portion F3 calculates a value (hereinafter, normalization wide area reception electric power) obtained by normalizing the reception electric power of the wide area vehicle information packet by the distance between the transmission source vehicle of the packet and the own vehicle, for every time when the wide area communication control portion F3 receives the wide area vehicle information packet transmitted from the different vehicle. Then, it is determined that the higher the average value of the normalization wide area reception electric power within the latest predetermined time, the better the communication quality. The normalization wide area reception electric power may be, for example, a value obtained by multiplying the reception electric power by a squared value of the distance between the transmission source vehicle and the own vehicle. The distance between the transmission source vehicle and the own vehicle can be calculated based on a current position of the transmission source vehicle indicated by the received vehicle information packet and the current position of the own vehicle.

Generally, the reception electric power of the wireless signal is attenuated to as to be inversely proportional to the square of a propagation distance. Therefore, multiplying the reception electric power of the wide area vehicle information packet by the square of the distance between the transmission source vehicle and the own vehicle corresponds to a process of restoring a transmission electric power of the wide area vehicle information packet in the transmission source vehicle. When the communication quality is good, the reception electric power is not easily affected by anything other than the propagation distance. Therefore, the normalization wide area reception electric power can be expected to be a relatively high value. On the other hand, when the communication quality is bad, the reception electric power is attenuated due to factors other than the propagation distance. Therefore, the transmission electric power is not completely restored by simply multiplying the square of the distance between the transmission source vehicle and the own vehicle. The normalization wide area reception electric power tends to be a relatively low value. A case where the communication quality deteriorates is, for example, a case where shadowing by a large vehicle occurs, a case where the area around the own vehicle is in a multipath environment, or the like.

The wide area direct communication quality may be expressed, for example, in three stages of a high level, a middle level, and a low level. The number of levels indicating the wide area direct communication quality is not limited to three, and may be two, four, or more. The wide area direct communication quality may be expressed by a score. In addition, when the SN ratio is used as a determination index of the communication quality, the quality determination portion F31 may determine that the higher an average level of the SN ratio, the higher (that is, better) the wide area direct communication quality. When the packet loss rate is used as the determination index of the wide area direct communication quality, the quality determination portion F31 may determine that the lower the packet loss rate, the higher the communication quality. When the carrier congestion degree is used as the determination index of the wide area direct communication quality, the quality determination portion F31 may determine that the smaller the carrier congestion degree, the higher the communication quality. The quality determination portion F31 corresponds to a wide area direct communication quality determination portion.

The report process portion F32 reports the current position pf the own vehicle or the like to the wireless base station 2. The report process portion F32 sequentially generates a vehicle status report (hereinafter, VSR) that is data indicating the current position, the transmission time point, the vehicle ID, or the like, and sequentially transmits the VSR to the wireless base station 2. The VSR corresponds to a signal indicating information for the wireless base station 2 to control the operation of the vehicle communication device 1. In the present embodiment, as a more preferable aspect, the VSR includes the advancing direction of the own vehicle, the wide area direct communication quality, the narrow area communication quality, an execution situation of the wide area periodic transmission process, and an execution situation of the narrow area periodic transmission process in addition to the information. The wide area direct communication quality indicates a wide area direct communication quality level determined by the wide area direct communication quality determination portion F31. The narrow area communication quality indicates the narrow area communication quality level determined by a quality determination portion F41. The execution situation of the wide area periodic transmission process indicates whether the wide area communication control portion F3 is executing the wide area periodic transmission process. The execution situation of the narrow area periodic transmission process indicates whether the narrow area communication control portion F4 is executing the narrow area periodic transmission process described below. The data indicating the execution situation of the narrow area periodic transmission process or the narrow area communication quality is provided from the narrow area communication control portion F4 as described below.

The narrow area communication control portion F4 controls the operation of the narrow area communication portion 12. The narrow area communication control portion F4 transmits the data to the different vehicle and receives the data from the different vehicle (that is, performs the narrow area inter-vehicle communication) in cooperation with the narrow area communication portion 12. The operation of the narrow area communication control portion F4 is controlled by the instruction of the wireless base station 2. The narrow area communication control portion F4 executes a process (hereinafter, narrow area periodic transmission process) of periodically multicasting the vehicle information packet by the narrow area direct communication at the predetermined transmission cycle based on the instruction of the wireless base station 2, for example. One transmission of the vehicle information packet is implemented by outputting the communication packet (that is, narrow area vehicle information packet) that includes the transmission vehicle information generated by the transmission data generation portion F2 and complies with the narrow area wireless communication standard to the wide area communication portion 11 and causing the narrow area communication portion 12 to perform the wireless transmission.

The narrow area vehicle information packet transmitted from the narrow area communication portion 12 is directly received by the different vehicle existing around the own vehicle. The execution state (that is, execution/pause) of the narrow area periodic transmission process by the narrow area communication control portion F4 is switched by the control signal from the wireless base station 2. For convenience, as the operation mode of the narrow area communication control portion F4, a state where the narrow area periodic transmission process is executed is also referred to as the periodic transmission mode. A state where the narrow area periodic transmission process is paused is also referred to as a transmission pause mode.

The narrow area communication control portion F4 acquires data (for example, the narrow area vehicle information packet from the different vehicle) received by the narrow area communication portion 12. The narrow area communication control portion F4 provides the vehicle information indicated by the acquired narrow area vehicle information packet to the reception data management portion F5. The vehicle information of the different vehicle acquired by the narrow area communication control portion F4 may be provided to the different ECU via the communication network 6.

The narrow area communication control portion F4 includes the quality determination portion F41 as a sub function. The quality determination portion F41 determines the communication quality (that is, narrow area communication quality) of the narrow area communication in the area around the own vehicle based on the reception situation of the wireless signal at the narrow area communication portion 12. Here, the area around the own vehicle corresponds to a range (for example, several hundred meters) assumed as a range where the narrow area communication can be performed. The narrow area communication quality can be determined based on the reception electric power of the narrow area vehicle information packet transmitted from the different vehicle, the SN ratio, the carrier congestion degree, or the packet loss rate.

For example, the quality determination portion F41 determines the narrow area communication quality by a method similar to the wide area direct quality determination method by the quality determination portion F31. That is, the narrow area communication control portion F4 calculates a value (hereinafter, normalization narrow area reception electric power) obtained by normalizing the reception electric power of the narrow area vehicle information packet by the distance between the transmission source vehicle of the packet and the own vehicle, for every time when the narrow area communication control portion F4 receives the wide area vehicle information packet transmitted from the different vehicle. Then, it is determined that the higher the average value of the normalization narrow area reception electric power within the latest predetermined time, the better the communication quality. The normalization narrow area reception electric power may be, for example, a value obtained by multiplying the reception electric power by a squared value of the distance between the transmission source vehicle and the own vehicle. As described above, the distance between the transmission source and the own vehicle can be calculated based on a current position of the transmission source vehicle indicated by the received vehicle information packet and the current position of the own vehicle. The quality determination portion F41 corresponds to a narrow area communication quality determination portion.

The narrow area communication quality may be expressed, for example, in three stages of the high level, the meddle level, and the low level. The number of levels indicating the narrow area communication quality is not limited to three, and may be two, four, or more. The narrow area communication quality may be expressed by a score. As described above, the narrow area communication control portion F4 may determine the narrow area communication quality by using the SN ratio or the like. The narrow area communication control portion F4 sequentially provides the narrow area communication quality calculated as described above to the wide area communication control portion F3.

The reception data management portion F5 associates the vehicle information of the different vehicle acquired by the narrow area communication control portion F4 and the wide area communication control portion F3 with the vehicle ID of the different vehicle, and saves the vehicle information in the memory M1. Thereby, the information regarding the different vehicle existing in the area around the own vehicle is managed separately for each vehicle. When saving the vehicle information in the memory M1, the reception data management portion F5 compares the vehicle information saved in the memory M1 with vehicle information to be stored. When the same data is already stored, the reception data management portion F5 discards the duplicate data without saving the data. This is because it is unnecessary to save the duplicate data.

For example, in a case where the vehicle information is provided from the wide area communication control portion F3 and in a case where the same data as the vehicle information is already saved in the memory M1, the reception data management portion F5 discards the vehicle information provided from the wide area communication control portion F3. Here, the same data is data having the same vehicle ID and the same generation time point of the data. The case where the same data as the vehicle information provided from the wide area communication control portion F3 is already saved in the memory M1 is a case where the same vehicle information is already provided from the narrow area communication control portion F4 before the wide area communication control portion F3. Even in the case where the vehicle information is provided from the narrow area communication control portion F4, the similar process is executed and thereby the saving of the duplicate data is avoided.

As the more preferable aspect of the present disclosure, when the reception data management portion F5 saves certain vehicle information, the reception data management portion F5 records an acquisition route of the vehicle information by using a flag or the like. For example, when the vehicle information provided from the narrow area communication control portion F4 is saved, a flag indicating the data acquired by the narrow area inter-vehicle communication is set to an on-state. When the vehicle information provided from the wide area communication control portion F3 is saved, a flag indicating the data acquired by the wide area inter-vehicle communication is turned on. Each of the flags for the data acquired by both routes should be turned on.

Figure 4A:
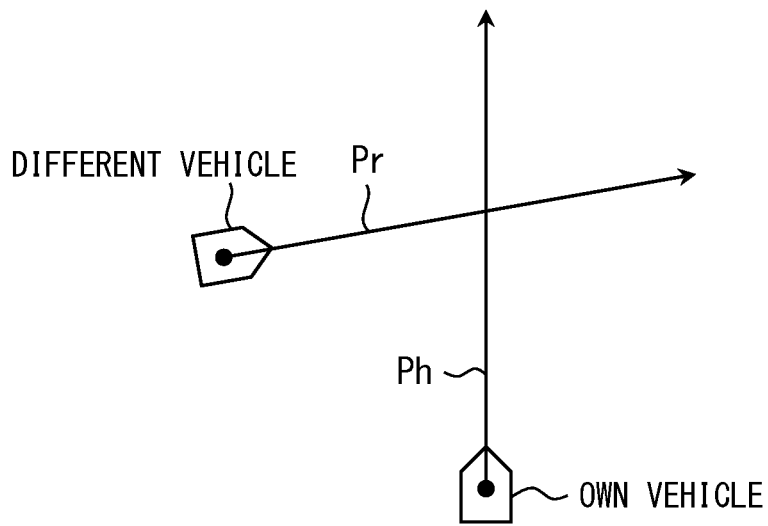
FIG. 4A is a diagram illustrating an operation of a collision risk estimation portion.
Figure 4B:
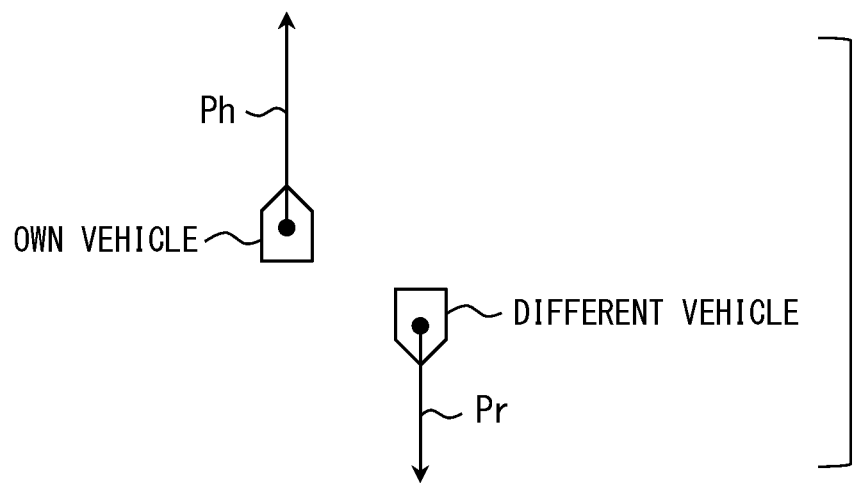
FIG. 4B is a diagram illustrating an operation of the collision risk estimation portion.

The collision risk estimation portion F6 extracts a vehicle (hereinafter, collision risk vehicle) that may collide with the own vehicle based on the own vehicle information and different vehicle information. For example, the collision risk estimation portion F6 extracts the collision risk vehicle based on a position relationship between a surrounding vehicle and the own vehicle and each advancing direction. The collision risk vehicle is, for example, a vehicle preceding the own vehicle. For example, as shown in FIG. 4A, the collision risk vehicle can be set to the different vehicle of which prediction track Pr intersects a prediction track Ph of the own vehicle. The prediction track Ph of the own vehicle is a track obtained by predicting a future traveling track of the own vehicle. For example, when the current position of the own vehicle is set to a start point, the prediction track Ph can be set to a half-line extending in the advancing direction of the own vehicle. The prediction track Pr of the different vehicle is a track obtained by predicting a feature traveling track of the different vehicle. When the current position of the different vehicle is set to a start point, the prediction track Pr can be set to a half-line extending in the advancing direction of the different vehicle. As shown in FIG. 4B, it is determined that there is no possibility of the collision with the own vehicle for the different vehicle existing at a position where the prediction track Pr does not intersect.

For the collision risk vehicle, the collision risk estimation portion F6 may sequentially calculate a time-to-collision (hereinafter, TTC) that is a remaining time until the collision risk vehicle collides with the own vehicle. When the TTC calculated for a certain different vehicle is equal to or more than a predetermined threshold value (for example, 5 seconds), the determination result may be amended to a determination result that the different vehicle is not the collision risk vehicle. In other words, the collision risk estimation portion F6 extracts the different vehicle having a TTC less than the predetermined threshold value as the collision risk vehicle. The TTC for one different vehicle may be calculated based on a relative position of a target object, a relative speed, and a relative movement direction. A variety of TTC calculation algorithms can be used. A TTC of a vehicle determined to have no collision possibility based on the position relationship between the different vehicle and the own vehicle and each traveling direction may be set to a predetermined value comparable to infinity.

(Configuration of Wireless Base Station)

A configuration of the wireless base station 2 will be described. As shown in FIG. 5, the wireless base station 2 includes a base station communication portion 21, a management database (hereinafter, management DB) 22, and a base station controller 23. The base station communication portion 21 is a communication module for wirelessly communicating with the UE such as the vehicle communication device 1. The base station communication portion 21 receives the signal destined for the wireless base station 2, for example, such as the VSR transmitted from the vehicle communication device 1, and provides the reception data to the base station controller 23. The base station communication portion 21 modulates the data input from the base station controller 23, and transmits the data to one or multiple vehicle communication devices 1. For example, the base station communication portion 21 transmits the control signal for providing instructions in order to, for example, pause or restart of the wide area periodic transmission process to one designated vehicle communication device 1.

The management DB 22 is a database implemented by a rewritable nonvolatile storage medium. The management DB 22 allows the base station controller 23 to write, read, or delete data or the like. Data indicating a current situation of each vehicle (in other words, each vehicle communication device 1) existing in the charge cell 3 of the wireless base station 2 is correlated with the vehicle ID, and is saved in the management DB 22. The cell situation data indicates the position information for each vehicle, the traveling direction, the wide area direct communication quality, the narrow area communication quality, the execution situation of the wide area periodic transmission process, or the execution situation of the narrow area periodic transmission process. The data for a certain vehicle is updated by an in-cell vehicle management portion G1 each time the VSR from the vehicle is received.

The data configuring the cell situation data for each vehicle communication device 1 may be held by an arbitrary data structure such as a list format. FIG. 6 conceptually shows the cell situation data. FIG. 6 shows vehicle IDs 101, 102, and 103 assigned to the vehicles Ma, Mb, and Mc as one example. For example, in FIG. 6, various information associated with the vehicle ID of 101 indicates data regarding the vehicle Ma.

The base station controller 23 controls the operation of the wireless base station 2. The base station controller 23 may be implemented by multiple computers. The base station controller 23 may be a virtually implemented server (so-called virtual server). The base station controller 23 is configured as a computer including a CPU 231, a flash memory 232, a RAM 233, an I/O 234, and a bus line connecting these components. The flash memory 232 stores a program (hereinafter, base station program) for causing a computer to function as the base station controller 23 or the like.

The base station program should be stored in the non-transitory tangible storage medium. The specific storage medium is not limited to the flash memory 232. Executing the base station program by the CPU 231 may be equivalent to executing a method corresponding to the authentication program.

When the CPU 231 executes the base station program stored in the flash memory 232, the base station controller 23 provides various functions shown in FIG. 7. That is, the base station controller 23 includes the in-cell vehicle management portion G1, an encounter determination portion G2, and an operation mode instruction portion G3.

The in-cell vehicle management portion G1 updates the position information stored in the management DB 22 for each vehicle or the like based on the VSR transmitted from the vehicle communication device 1. That is, the transmission source position information of the communication packet, the movement speed, the advancing direction, the wide area direct communication quality, and the narrow area communication quality that are stored in the management DB 22 are updated every time the base station communication portion 21 receives the VSR.

The encounter determination portion G2 determines whether there is a possibility that the vehicles existing in the charge cell 3 encounter each other. The operation mode instruction portion G3 transmits a control signal for instruction of the change of the operation mode of the wide area communication control portion F3 or the like to the vehicle communication device 1 existing in the charge cell 3 in cooperation with the base station communication portion 21. The operation mode instruction portion G3 cooperates with the base station communication portion 21, and can transmit a wide area pause instruction signal, a wide area transmission instruction, a narrow area pause instruction signal, or a narrow area transmission instruction signal to the specific vehicle communication device 1. The operation mode instruction portion G3 corresponds to a device control portion.

Details of the operations of the encounter determination portion G2 and the operation mode instruction portion G3 will be described later. The wide area pause instruction signal is a control signal instructing to pause the wide area periodic transmission process. Transmitting the wide area pause instruction signal corresponds to setting the operation mode of the wide area communication control portion F3 to the transmission pause mode. The wide area transmission instruction signal is a control signal for instruction to restart (in other words, execute) the wide area periodic transmission process. Transmitting the wide area transmission instruction signal corresponds to setting the operation mode of the wide area communication control portion F3 to the periodic transmission mode. The narrow area pause instruction signal is a control signal for instruction to pause the narrow area periodic transmission process. Transmitting the narrow area pause instruction signal corresponds to setting the operation mode of the narrow area communication control portion F4 to the transmission pause mode. The narrow area transmission instruction signal is a control signal for instructing to restart (in other words, execute) the narrow area periodic transmission process. Transmitting the narrow area transmission instruction signal corresponds to setting the operation mode of the narrow area communication control portion F4 to the periodic transmission mode.

(Pause Instruction Related Process)

Figure 8:
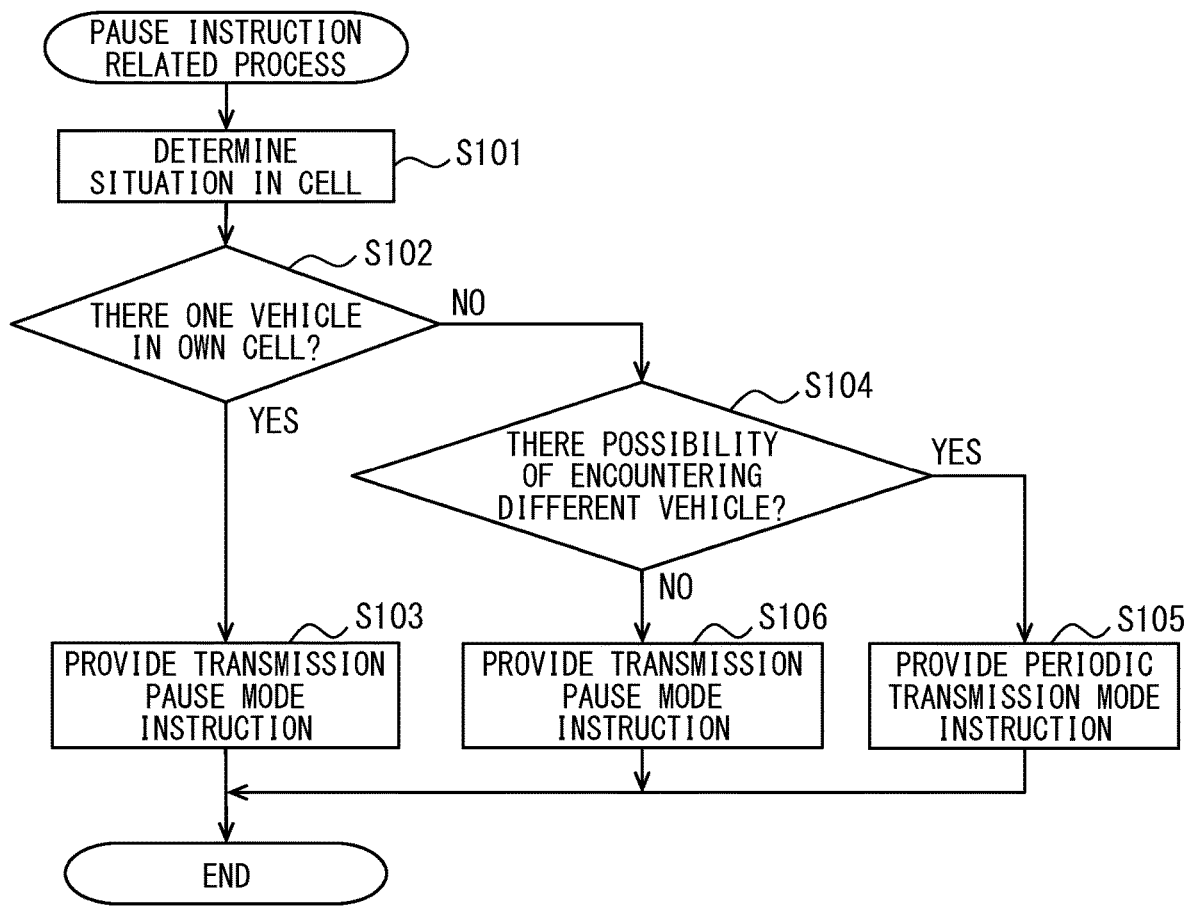
FIG. 8 is a flowchart of a pause instruction related process.

A pause instruction related process executed by the wireless base station 2 (mainly the base station controller 23) will be described with reference to a flowchart shown in FIG. 8. The pause instruction related process is a process for instructing the vehicle communication device 1 existing in the charge cell 3 to pause the wide area periodic transmission process. When the VSR is received, the pause instruction related process may be executed for the vehicle communication device 1 that is the transmission source of the VSR. For convenience, the vehicle communication device 1 that has transmitted the VSR is referred to as the transmission source device. The vehicle in which the transmission source device is mounted is referred to as the transmission source vehicle.

The pause instruction related process may be executed when the VSR is received from the vehicle communication device 1 that is executing the wide area periodic transmission process. It is possible to specify whether the wide area periodic transmission process is being executed by, for example, referring to the VSR. Here, as one example, when the VSR is received, the pause instruction related process is executed. However, the execution condition of the pause related process is not limited to this. The pause instruction related process may be executed for each vehicle communication device 1 (or each vehicle) existing in the charge cell 3 at a predetermined execution cycle (for example, every 100 milliseconds).

In S101, the encounter determination portion G2 refers to in-cell situation data stored in the management DB 22, and determines the number of vehicles existing in the charge cell 3 or the like. The process shifts to S102. In S102, it is determined whether the number of vehicles existing in the charge cell 3 is one. The situation where the number of vehicles existing in the charge cell 3 is one corresponds to a situation where only the transmission source vehicle exists in the charge cell 3. When only the transmission source vehicle exists in the charge cell 3, S103 is executed. On the other hand, when the vehicle (that is, different vehicle) other than the transmission source vehicle exists in the charge cell 3, S104 is executed. The situation where only the transmission source vehicle exists in the charge cell 3 is also included in the situation where there is no possibility that the transmission source vehicle encounters the different vehicle.

In S103, the operation mode instruction portion G3 cooperates with the base station communication portion 21, and transmits the wide area pause instruction signal to the transmission source device. This flow ends. S103 corresponds to a step instructing the wide area communication control portion F3 to become the transmission pause mode. In S104, the encounter determination portion G2 determines whether the transmission source vehicle encounters the different vehicle based on the position information and the advancing direction that are stored in the management DB 22 for each vehicle.

The possibility that transmission source vehicle encounters the different vehicle can be determined based on whether the prediction track of the transmission source vehicle intersects with the prediction track of the different vehicle similarly to a method that is performed by the collision risk estimation portion F6 and extracts the collision risk vehicle. The prediction track of the transmission source vehicle is a track obtained by predicting a future traveling track of the transmission source vehicle. For example, when the current position of the transmission source vehicle is set to a start point, the prediction track can be set to a half-line extending in the advancing direction of the transmission source vehicle. Also, in a case of the prediction track of the different vehicle, when the current position of the different vehicle is set to the start point, the prediction track can be set to the half-line extending in the advancing direction of the different vehicle (or a line segment having a predetermined length).

The encounter determination portion G2 determines that there is a possibility that the transmission source vehicle encounters the different vehicle when the different vehicle of which prediction track intersects the prediction track of the transmission source vehicle exists. The encounter determination portion G2 determines that there is no possibility that the transmission source vehicle encounters the different vehicle when the different vehicle of which prediction track intersects with the prediction track of the transmission source vehicle does not exist.

As another aspect, the encounter determination portion G2 may determine that there is a possibility that the transmission source vehicle encounters the different vehicle based on the existence of the different vehicle within a predetermined distance from the transmission source vehicle. The encounter determination portion G2 may determine that there is no possibility that the transmission source vehicle encounters the different vehicle based on no existence of the different vehicle within the predetermined distance from the transmission source vehicle. The predetermined distance may be set to, for example, 200 meters.

Further, the encounter determination portion G2 may determine that there is the possibility that the transmission source vehicle encounters the different vehicle when the different vehicle that is an oncoming vehicle for the transmission source vehicle exists. The different vehicle as the oncoming vehicle for the transmission source vehicle is a different vehicle that exists in the advancing direction of the transmission source vehicle and travels in an opposite direction to the transmission source vehicle. Here, the opposite direction is not limited to the exact opposite direction, and may be deviated by ±30° from the exact opposite direction.

When it is determined that there is the possibility that the transmission source vehicle encounters the different vehicle, the process in S105 is executed. On the other hand, when it is determined that there is no possibility that the transmission source vehicle encounters the different vehicle, the process in S106 is executed. A state where the vehicles have already encountered each other is included in the state having the possibility that the vehicles encounter each other. In S105, the operation mode instruction portion G3 cooperates with the base station communication portion 21, and transmits the wide area transmission instruction signal to the transmission source device. This flow ends. S105 corresponds to a step instructing the wide area communication control portion F3 to become the periodic transmission mode. When the wide area communication control portion F3 of the transmission source device is already executing the wide area periodic transmission process, S105 may be omitted. Further, when the wide area communication control portion F3 of the transmission source device is already executing the wide area periodic transmission process, a control signal (hereinafter, wide area mode maintenance signal) instructing to maintain the current operation mode of the wide area communication control portion F3 may be transmitted in S105. In S106, the operation mode instruction portion G3 cooperates with the base station communication portion 21, and the wide area pause instruction signal is transmitted to the transmission source device. This flow ends. S106 corresponds to a step instructing the wide area communication control portion F3 to become the transmission pause mode.

(Transmission Restart Instruction Related Process)

Figure 9:
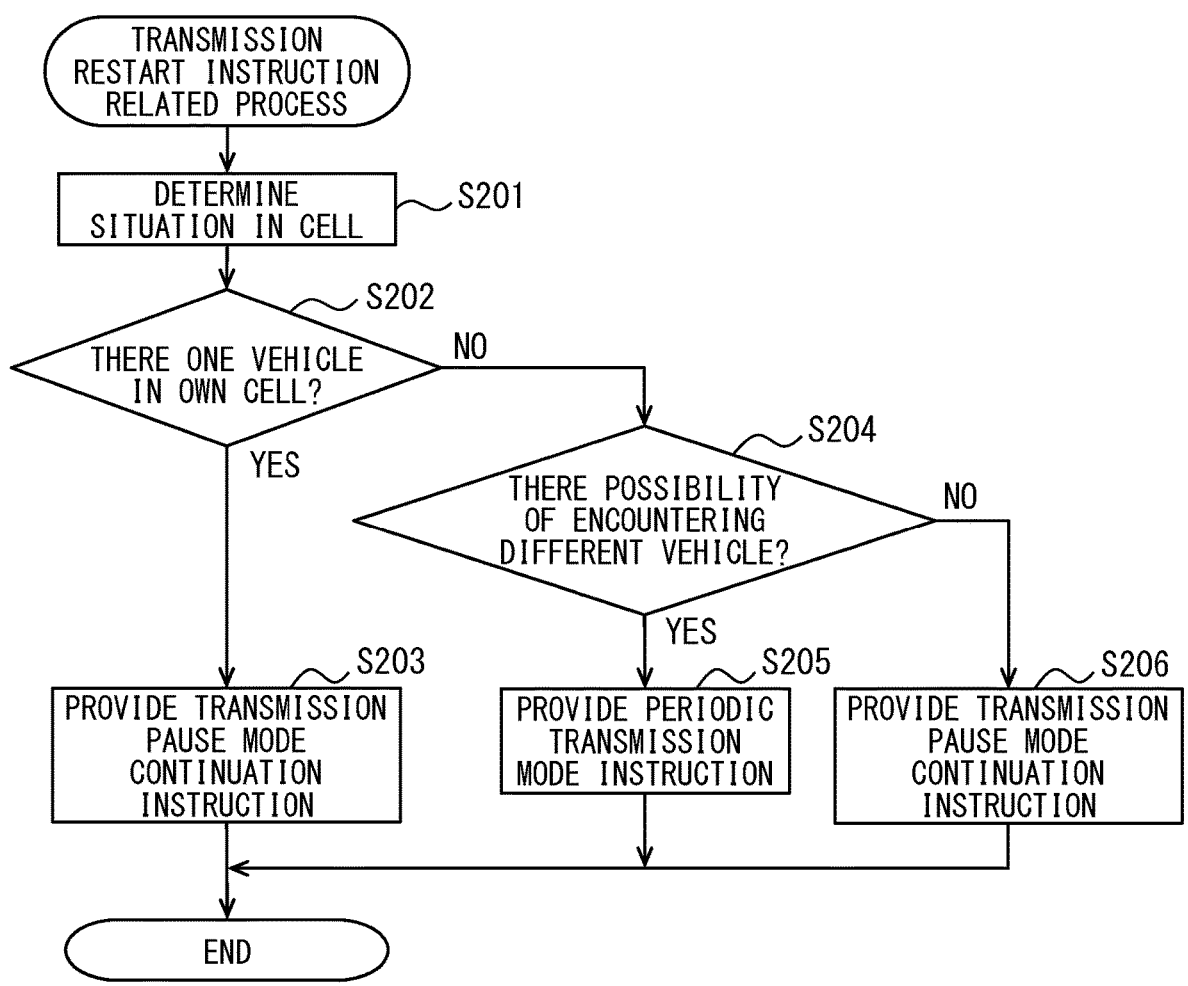
FIG. 9 is a flowchart of a transmission restart instruction related process.

A transmission restart instruction related process executed by the wireless base station 2 (mainly base station controller 23) will be described with reference to FIG. 9. The transmission restart instruction related process is a process for instructing the vehicle communication device 1 that exists in the charge cell 3 and is pausing the execution of the wide area periodic transmission process to restart the wide area periodic transmission process. The transmission restart instruction related process may be executed when the VSR is received from the vehicle communication device 1 pausing the wide area periodic transmission process. The transmission restart instruction related process includes S201 to S206 as one example.

In S201, the in-cell situation data stored in the management DB 22 is referred, and the number of vehicles existing in the charge cell 3 or the like is determined. The process shifts to S202. In S202, it is determined whether the number of vehicles existing in the charge cell 3 is one. As described above, the situation where the number of vehicles existing in the charge cell 3 is one corresponds to a situation where only the transmission source vehicle exists in the charge cell 3. When only the transmission source vehicle exists in the charge cell 3, the process in S203 is executed. On the other hand, when the vehicle (that is, different vehicle) other than the transmission source vehicle exists in the charge cell 3, the process in S204 is executed.

In S203, the operation mode instruction portion G3 cooperates with the base station communication portion 21, and transmits the wide area pause instruction signal to the transmission source device. This flow ends. S203 corresponds to a step instructing the wide area communication control portion F3 to become the transmission pause mode. Since the transmission source device is already pausing the wide area periodic transmission process, S203 may be omitted. Further, in S203, the wide area mode maintenance signal may be transmitted.

In S204, the encounter determination portion G2 determines whether the transmission source vehicle encounters the different vehicle based on the position and the advancing direction that are stored in the management DB 22 for each vehicle. The determination method can be set to the method similar to that in S104. When the encounter determination portion G2 determines that there is the possibility that the transmission source vehicle encounters the different vehicle, the process in S205 is executed. On the other hand, when the encounter determination portion G2 determines that there is no possibility that the transmission source vehicle encounters the different vehicle, the process in S206 is executed.

In S205, the operation mode instruction portion G3 cooperates with the base station communication portion 21, and transmits the wide area transmission instruction signal to the transmission source device. This flow ends. S205 corresponds to the step instructing the wide area communication control portion F3 to become the periodic transmission mode. By transmitting the wide area transmission instruction signal as S205, the transmission source device is caused to restart the wide area periodic transmission process. In S206, the operation mode instruction portion G3 cooperates with the base station communication portion 21, and the wide area pause instruction signal is transmitted to the transmission source device. This flow ends. S206 corresponds to the step instructing the wide area communication control portion F3 to become the transmission pause mode. S206 can be omitted similarly to S203.

(Mode Control Process Based on Communication Quality)

Figure 10:
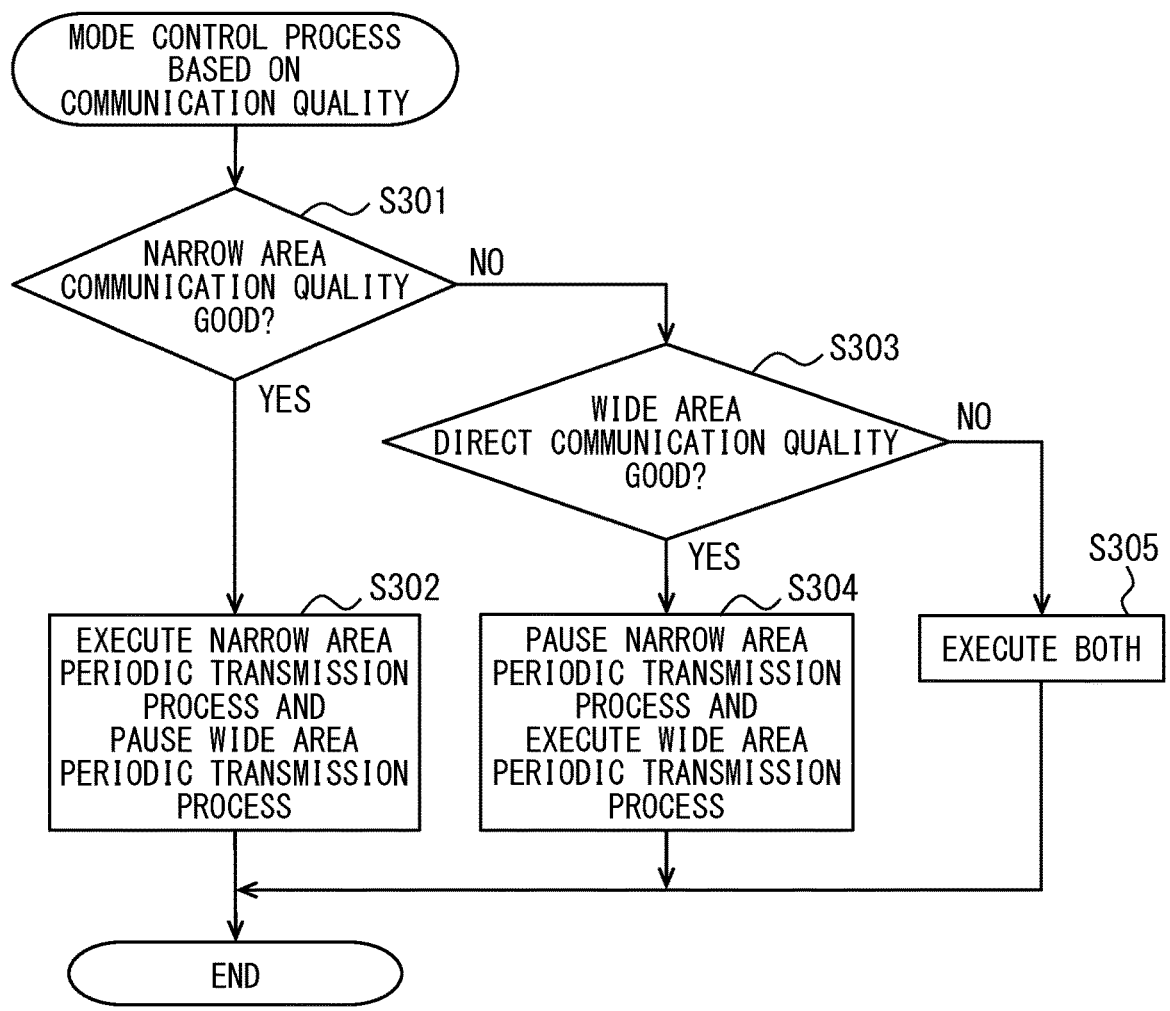
FIG. 10 is a flowchart of a mode control process based on a communication quality.

A mode control process based on the communication quality executed by the wireless base station 2 (mainly base station controller 23) will be described with reference to FIG. 10. The mode control process based on the communication quality is a process that controls the operation mode of the vehicle communication device 1 that exists in the charge cell 3 and should periodically transmit the vehicle information packet. The vehicle communication device 1 that should periodically transmit the vehicle information packet is the vehicle communication device 1 used in the vehicle that may encounter the different vehicle. The mode control process based on the communication quality may be executed when the VSR received from the vehicle communication device 1 executing at least one of the wide area periodic transmission process or the narrow area periodic transmission. The mode control process based on the communication quality may be executed as S105 in FIG. 8 or S205 in FIG. 9. The mode control process based on the communication quality includes S301 to S305 as one example.

In S301, the operation mode instruction portion G3 determines whether the narrow area communication quality around the transmission source device is good. For example, when the narrow area communication quality is set to the high level in the received VSR, it is determined that the narrow area communication quality around the transmission source device is good. On the other hand, when the narrow area communication quality of the received VSR is set to the middle level or the low level, it is determined that the narrow area communication quality around the transmission source device is not good. Whether the narrow area communication quality around the transmission source device is good or bad may be determined based on the determination result of the narrow area communication quality of the multiple vehicle communication devices 1 existing around the transmission source device. For example, the narrow area communication quality around the transmission source device may be determined based on the average or the majority vote of the narrow area communication quality determination results of the vehicle communication devices 1 around the transmission source devices.

When the narrow area communication quality around the transmission source device is determined to be good, S302 is executed. On the other hand, when the narrow area communication quality around the transmission source device is determined to be not good, S303 is executed. In S302, the operation mode instruction portion G3 cooperates with the base station communication portion 21, and the narrow area transmission instruction signal and the wide area pause instruction signal are transmitted. This flow ends. The wireless base station 2 may be capable of transmitting the control signal that also serves as the narrow area transmission instruction signal and the wide area pause instruction signal.

In S303, the operation mode instruction portion G3 determines whether the narrow area communication quality around the transmission source device is not good and whether the wide area direct communication quality is good. For example, when the narrow area communication quality is set to the middle level or the low level in the received VSR, it is determined that the narrow area communication quality around the transmission source device is not good. When the wide area direct communication quality is set to the high level in the received VSR, it is determined that the communication quality of the wide area direct communication around the transmission source device is good. Whether the wide area direct communication quality around the transmission source device is good may be determined based on the VSRs from the multiple vehicle communication devices 1 existing around the transmission source device.

In S303, when it is determined that the narrow area communication quality around the transmission source device is not good and the wide area direct communication quality is good, S304 is executed. On the other hand, when both of the wide area direct communication quality and the narrow area communication quality are not good, S305 is executed. In S304, the operation mode instruction portion G3 cooperates with the base station communication portion 21, and the wide area transmission instruction signal and the narrow area pause instruction signal are transmitted. This flow ends. The wireless base station 2 may be capable of transmitting, as one signal, the control signal that also serves as the wide area transmission instruction signal and the narrow area pause instruction signal. In S305, the operation mode instruction portion G3 cooperates with the base station communication portion 21, and transmits a control signal for executing or continuing both of the wide area periodic transmission process and the narrow area periodic transmission process. This flow ends.

(Communication Control Process)

Figure 11:
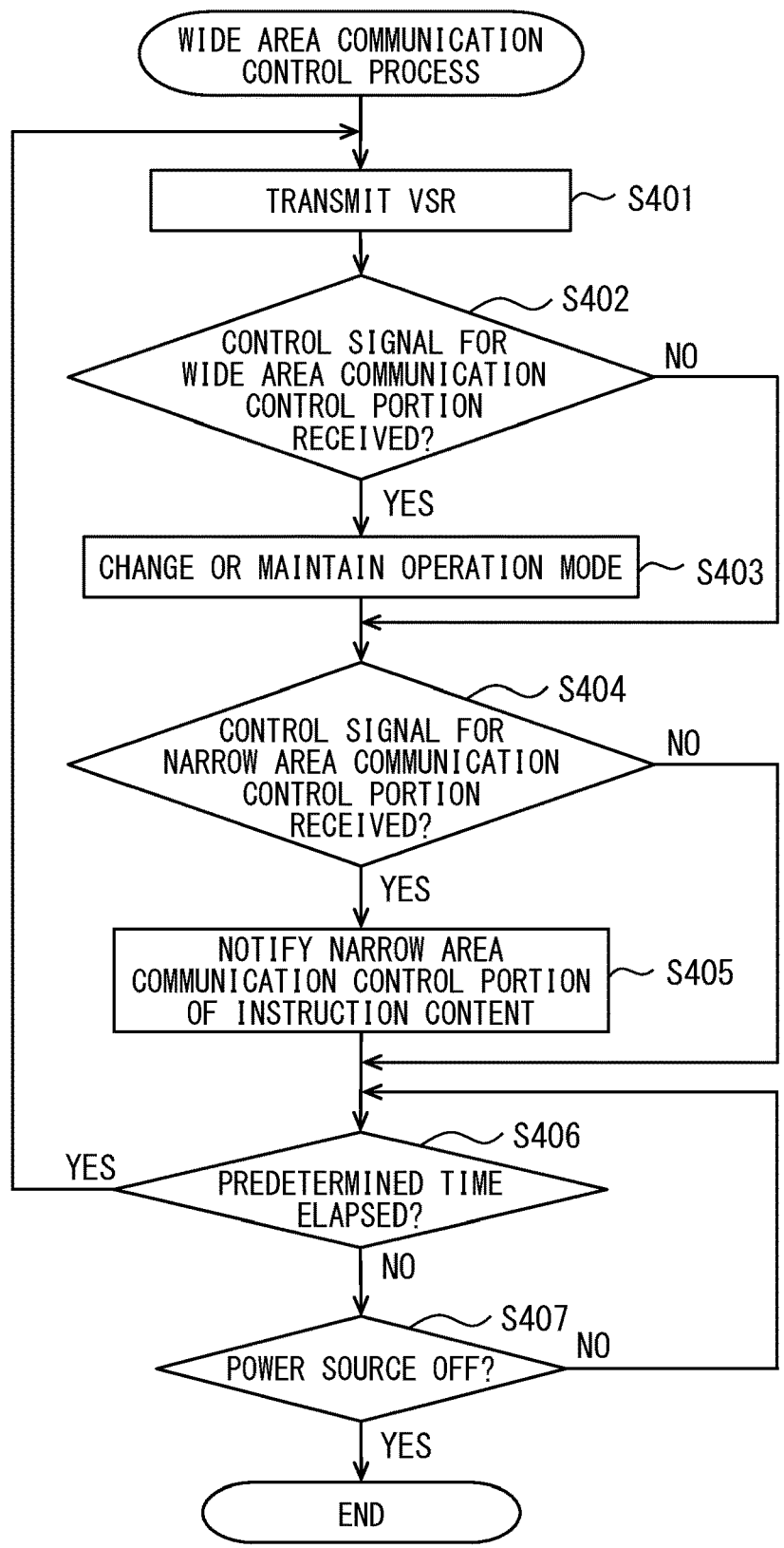
FIG. 11 is a flowchart of a wide area communication control process.

A wide area communication control process executed by the wide area communication control portion F3 of the vehicle communication device 1 will be described with reference to a flowchart shown in FIG. 11. The wide area communication control process is a process related to the change of the operation mode of the wide area communication control portion F3. In one example of the present embodiment, the wide area communication control process includes S401 to S407. In the flowchart shown in FIG. 11, a step of transmitting the vehicle information packet by wide area direct communication is not shown. The process of periodically multicasting the vehicle information packet by the wide area direct communication may be sequentially executed as the wide area periodic transmission process while the wide area communication control portion F3 is set to the periodic transmission mode.

In S401, the report process portion F32 cooperates with the wide area communication portion 11, and transmits the VSR indicating the current own vehicle state to the wireless base station 2. The process shifts to S402. In S402, it is determined whether the control signal for the wide area communication control portion F3 is received from the wireless base station 2. The control signal for the wide area communication control portion F3 is, for example, the wide area transmission instruction signal, the wide area pause instruction signal, or the like. When the control signal for the wide area communication control portion F3 is received, S403 is executed. On the other hand, when the control signal for the wide area communication control portion F3 is not received, S404 is executed.

In S403, the operation mode is changed or maintained based on the instruction from the wireless base station 2. For example, when the wide area pause instruction signal is received in a state where the operation mode executes the wide area periodic transmission process, the wide area periodic transmission process is paused. In other words, when the wide area pause instruction signal is received in the periodic transmission mode, the operation mode is set to the transmission pause mode. Thereby, the periodic transmission of the vehicle information packet by the wide area direct communication is paused. When the wide area transmission instruction signal is received in a state where the wide area periodic transmission process is paused, the wide area periodic transmission process is restarted. In other words, in a state where the operation mode is set to the transmission pause mode, when the wide area transmission instruction is received, the operation mode is set to the periodic transmission mode. Thereby, the periodic multicasting of the vehicle information packet by the wide area direct communication is restarted. when the wide area maintenance signal is received, the operation mode at the time of the reception may be maintained.

In S404, it is determined whether the control signal for the narrow area communication control portion F4 is received from the wireless base station 2. The control signal for the narrow area communication control portion F4 is, for example, the narrow area transmission instruction signal, the narrow area pause instruction signal, or the like. When the control signal for the narrow area communication control portion F4 is received, S405 is executed. On the other hand, when the control signal for the narrow area communication control portion F4 is not received, S406 is executed.

In S405, the narrow area communication control portion F4 is notified of the instruction content from the wireless base station 2. For example, when the narrow area transmission instruction signal is received, it is notified that the narrow area communication control portion F4 is instructed to execute the narrow area periodic transmission process. When the narrow area pause instruction signal is received, it is notified that the narrow area communication control F4 is instructed to pause the narrow area periodic transmission process. The narrow area communication control portion F4 changes the execution state (in other words, the operation mode) of the narrow area periodic transmission process based on the content notified from the wide area communication control portion F3.

The process in S405 is completed, and shifts to S406. In S406, it is determined that a predetermined time (for example, 100 milliseconds) comparable with the transmission interval of the VSR has elapsed from the time of transmission of the VSR in S401. When the predetermined time has not elapsed from the time of the transmission of the previous VSR, the determination is negative in S406. S407 is executed. On the other hand, when the predetermined time has elapsed from the time of the transmission of the previous VSR, the determination is positive in S406. The process from S401 is executed again. In S407, it is determined that a traveling power source (for example, ignition power source) is set to an off-state. When the traveling power source is turned on, the process returns to S406. On the other hand, the traveling power source is set to the off state, this flow ends.

In the configuration described above, the wireless base station 2 unifies management of the information of the vehicle existing in the charge cell 3, and causes the vehicle communication device 1 having no possibility of encountering the different vehicle to pause the periodic transmission of the vehicle information packet by the wide area direct communication. Thereby, it may be possible to reduce the consumption electric power and the heat generation of the vehicle communication device 1 since the load on the wide area communication portion 11 and the communication controller 13 is reduced.

In addition, even in a situation where the vehicles may encounter each other, when the narrow area communication quality is sufficiently good, the narrow area periodic transmission process is continued and the periodic multicasting of the vehicle information by the wide area direct communication is paused. It may be possible to reduce the consumption electric power and the heat generation of the vehicle communication device 1 by pausing the wide area periodic transmission process. Since the narrow area periodic transmission process is continued, the state where the vehicles can share the vehicle information with each other is maintained. In addition, since the process is executed on a condition that the narrow area communication quality is good, there is a low possibility that the narrow area inter-vehicle communication fails. It may be possible to maintain the reliability as the inter-vehicle communication system at the same level as a level when a dual system of the wide area inter-vehicle communication and the narrow area inter-vehicle communication is operated. In addition, even in a situation where the vehicles may encounter each other, when the wide area direct communication quality is sufficiently good, the wide area periodic transmission process is continued and the narrow area periodic transmission process is paused. It may be possible to reduce the consumption electric power and the heat generation of the vehicle communication device 1 by pausing the narrow area periodic transmission process. Since the wide area periodic transmission process is continued, the state where the vehicles can share the vehicle information is maintained. In addition, since the process is executed on a condition that the wide area direct communication quality is good, there is a low possibility that the wide area inter-vehicle communication fails. It may be possible to maintain the reliability of the communication as the inter-vehicle communication system at the same level as a level when the dual system of the wide inter-vehicle communication and the narrow area inter-vehicle communication is operated.

While the first embodiment of the present disclosure has been described above, the present disclosure is not limited to the embodiment described above, and various modifications described below are included in the technical scope of the present disclosure, and may be implemented by various modifications within a scope not departing from the spirit described below. For example, various modifications to be described below can be implemented in appropriate combination within a scope that does not cause technical inconsistency.

Members having a function identical to that of the members described in the above embodiment will be denoted by identical reference signs and will not be described repeatedly. In a case where only part of any configuration is described, the preceding embodiment is applicable to the remaining part of the configuration.

(First Modification)

In the first embodiment, when only the transmission source vehicle exists in the charge cell 3 (YES in S102), the wireless base station 2 pauses only the wide area periodic transmission process and continues the narrow area periodic transmission process. However, the control aspect of the vehicle communication device 1 by the wireless base station 2 is not limited to this. When the transmission source vehicle exists in the charge cell 3, the wireless base station 2 may instruct to pause both of the wide area periodic transmission process and the narrow area periodic transmission process.

Specifically, as S103, the wireless base station 2 may transmit both of the wide area pause instruction signal and the narrow area pause instruction signal to the transmission source vehicle. The wireless base station 2 may be capable of transmitting, as the control signal, one control signal (hereinafter, both pause instruction signal) that serves the wide area pause instruction signal and the narrow area pause instruction signal.

When determining that there is no possibility that the transmission source vehicle encounters the different vehicle in a situation where the multiple vehicles exist in the charge cell 3 (YES in S104), the wireless base station 2 may pause both of the wide area periodic transmission process and the narrow area periodic transmission process. Specifically, as S105, the wireless base station 2 may transmit both of the wide area pause instruction signal and the narrow area pause instruction signal to the transmission source vehicle.

According to a configuration disclosed as the first modification, the operations of the wide area communication portion 11, the narrow area communication portion 12, and the communication controller 13 are further reduced. Therefore, it may be possible to further reduce the current consumption and the heat generation of the vehicle communication device 1. In this modification, as S205, both of the wide area periodic transmission process and the narrow area periodic transmission process are restarted.

(Second Modification)

In addition to the inter-vehicle communication by the narrow area communication and the inter-vehicle communication by the wide area direct communication, the vehicle communication device 1 may be capable of indirectly performing inter-vehicle communication (hereinafter, indirect inter-vehicle communication) via the wireless base station 2. Hereinafter, one example of a configuration corresponding to the above-described technical idea will be described as a second modification.

Figure 12:
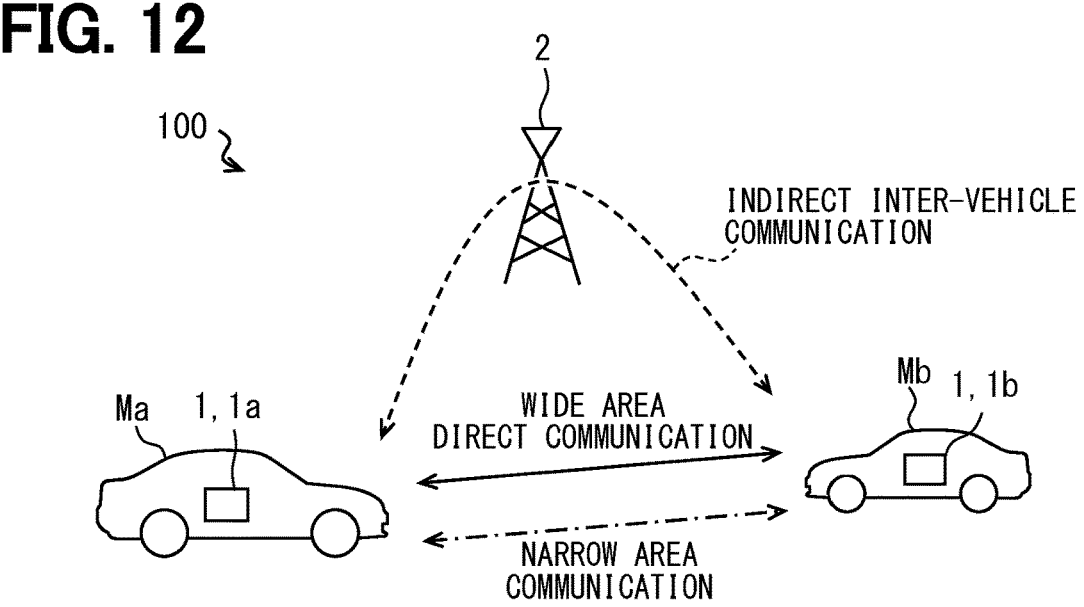
FIG. 12 is a diagram conceptually showing an operation of the inter-vehicle communication system according to a second modification.

As shown in FIG. 12, the vehicle communication device 1 (particularly wide area communication control portion F3) of the second modification performs the indirect inter-vehicle communication based on the instruction from the wireless base station 2. Specifically, based on the instruction from the wireless base station 2, the vehicle information packet (hereinafter, transfer vehicle information packet) addressed to the wireless base station 2 is generated, and is transmitted. The solid line arrow shown in FIG. 12 represents the flow of the vehicle information by the wide area direct communication. The arrow of the long dashed short dashed line conceptually represents the flow of the vehicle information by the narrow area communication. The dashed arrow conceptually represents the flow of the vehicle information by the indirect inter-vehicle communication.

The wireless base station 2 of this modification transfers the transfer vehicle information packet transmitted from the mounted vehicle to the different vehicle (that is, surrounding vehicle) existing around the transmission source vehicle. The area around the transmission source vehicle is set to a range within a predetermined transfer inter-vehicle distance from the vehicle. The transfer inter-vehicle distance is a parameter for extracting the vehicle (in other words, surrounding vehicle for the transmission source vehicle) as the transfer destination of the transfer vehicle information packet received from various vehicles. The current position of each vehicle may be specified based on the VSR sequentially transmitted from each vehicle.

The transfer inter-vehicle distance may be set to a constant value (for example, 300 meters) or may be dynamically decided in accordance with the traveling speed of the transmission source vehicle. Here, as one example, the transfer inter-vehicle distance is set to a larger value as the traveling speed of the transmission source vehicle becomes higher. The different vehicle existing within the transfer inter-vehicle distance from the transmission source vehicle corresponds to the surrounding vehicle.

As another aspect, the transfer inter-vehicle distance may be dynamically adjusted to a value in accordance with the type of road on which the transmission source vehicle travels. For example, when the traveling road is a freeway, the transfer inter-vehicle distance may be set to a relatively high value (for example, 400 meters). When the traveling road is a general road, the transfer inter-vehicle may be set to a relatively small value (for example, 200 meters).

As described above, when the vehicle information packet transmitted from a certain vehicle is received, the wireless base station 2 of the present modification extracts the vehicle existing within the transfer inter-vehicle distance that is a straight line distance from the transmission source vehicle based on the in-cell situation data stored in the management DB 22. The received vehicle information packet is transferred to the extracted vehicle. Thereby, the wireless base station 2 indirectly provides the inter vehicle communication (that is, provides the indirect inter-vehicle communication).

For example, when the communication qualities of both wide area direct communication and narrow area communication are not good (for example, when the level is low), the wireless base station 2 instructs the vehicle communication device 1 to perform the indirect inter-vehicle communication. Specifically, in S305 of FIG. 10, the wireless base station 2 instructs the vehicle communication device 1 to perform the indirect inter-vehicle communication. Then, it may be instructed to pause at least one of the wide area periodic transmission process or the narrow area periodic transmission process.

According to the configuration described above, when the communication qualities of both wide area direct communication and the narrow area communication are not good, the vehicles share the vehicle information with each other by the indirect inter-vehicle communication. Therefore, it may be possible to improve the communication reliability of the inter-vehicle communication system. When at least one of the wide area direct communication or the narrow area communication is good, the vehicles directly perform the wireless communication with each other. Therefore, it may be possible to suppress communication delay and communication fee.

Second Embodiment

Figure 13:
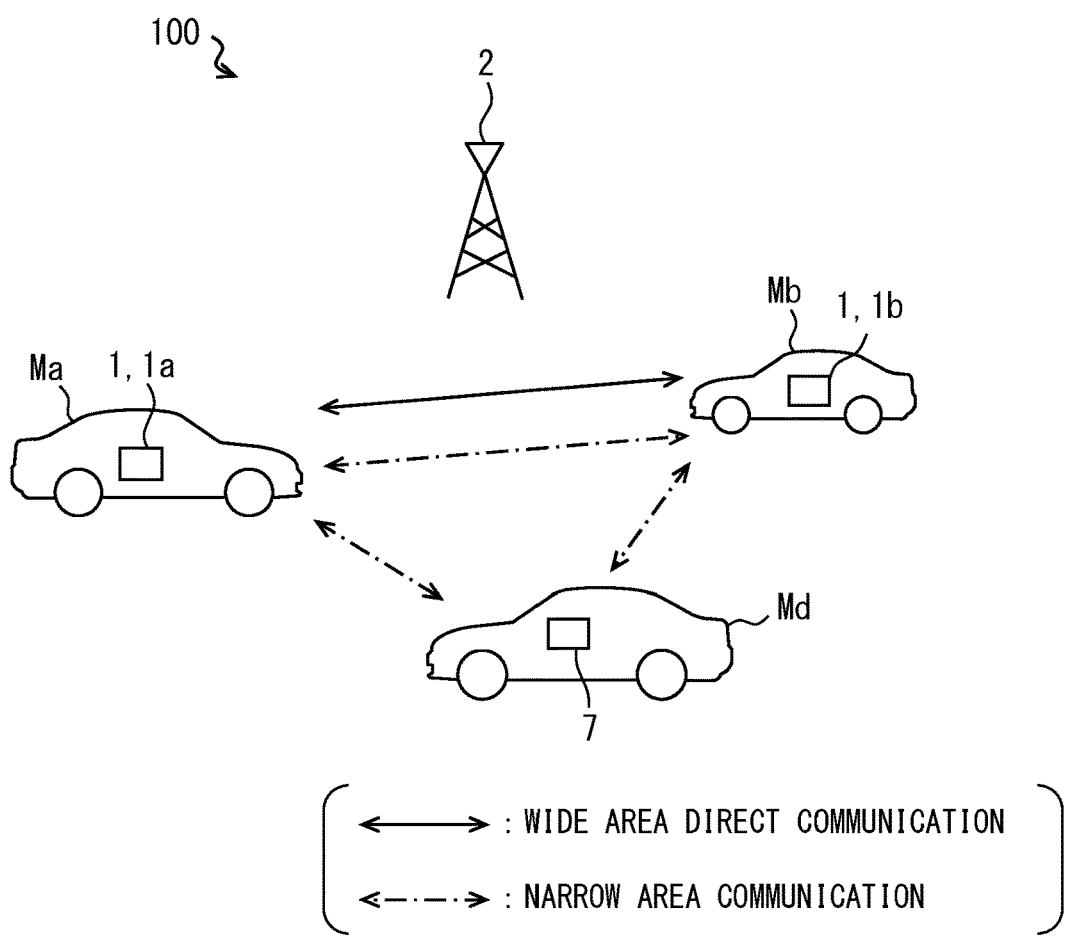
FIG. 13 is a diagram showing an overall configuration of the inter-vehicle communication system according to a second embodiment.

As shown in FIG. 13, the inter-vehicle communication system 100 may include a narrow area dedicated device 7 that has only the narrow area communication function (in other words, does not have the wide area direct communication) in addition to the vehicle communication device 1 having the narrow area communication function and the wide area direct communication function. The narrow area dedicated device 7 is also the communication device for performing the inter-vehicle communication, mounted in the vehicle Md, and used. A configuration corresponding to the above idea will be described below as a second embodiment.

Hereinafter, for convenience, the vehicle having only the narrow area communication function is referred to as a narrow area dedicated vehicle. The vehicle including the vehicle communication device 1 is also referred to as a both function mounted vehicle. The both function mounted vehicle corresponds to a vehicle having both of the narrow area communication function and the wide area direct communication. When the narrow area dedicated device 7 and the vehicle communication device 1 are not distinguished, they are referred to as the inter-vehicle communication device. The narrow area dedicated device 7 corresponds to a wide area communication non-compliant device.

As shown in FIG. 14, the narrow area dedicated device 7 includes a narrow area communication portion 71 and a communication control portion 72. The narrow area communication portion 71 corresponds to the narrow area communication portion 12 described above. The communication control portion 72 cooperates with the narrow area communication portion 71, and executes a process of transmitting and receiving the vehicle information packet. The communication control portion 72 has a function corresponding to the vehicle information acquisition portion F1 and the transmission data generation portion F2.

In the present embodiment, various inter-vehicle communication devices such as the vehicle communication device 1 and the narrow area dedicated device 7 transmit, as the narrow area vehicle information packet, the communication packet including mounted function information in addition to the above-described information such as the current position or the generation time point. The mounted function information is information indicating the communication function of the transmission source device, and indicating that the transmission source device has both of the narrow area communication function and the wide area direct communication or has only the narrow area communication function. For example, the narrow area dedicated device 7 multicasts the vehicle information packet indicating that the transmission device has only the narrow area communication function. In other words, the narrow area dedicated device 7 multicasts the similar vehicle information packet indicating that the transmission source device has only the narrow area communication function to multiple vehicles. In the other hand, the vehicle communication device 1 multicasts the vehicle information packet indicating that the transmission source vehicle has both of the narrow area communication function and the wide area direct communication. The mounted function information may be substituted by version information of the communication device, a model number, or the like. The mounted function information may be described in a header or the like. The mounted function information may be expressed by a flag or the like.

When receiving the vehicle information packet indicating that the transmission source device has only the narrow area communication function, the vehicle communication device 1 reports to the wireless base station 2 that the narrow area dedicated vehicle exists. The report of the existence of the narrow area dedicated vehicle to the wireless base station 2 may be, for example, implemented by providing the VSR with data indicating whether the narrow area dedicated vehicle exists.

In the above configuration, the wireless base station 2 determines whether the narrow area dedicated vehicle (in other words, narrow area dedicated device 7) exists in the charge cell 3 based on the VSR transmitted from each vehicle communication device 1. When the narrow area dedicated vehicle does not exist in the charge cell 3, the wireless base station 2 transmits both of the wide area pause instruction signal and the narrow area pause instruction signal to the transmission source vehicle as the process in S103 or S105 as described in the first modification. The wide area pause instruction signal and the narrow area pause instruction signal may be integrated into one control signal as the both pause instruction signal. The wireless base station 2 can adopt a measure of transmitting the narrow area pause instruction signal as the process in S304 when the narrow area dedicated vehicle does not exist in the charge cell 3.

Thereby, similarly to the first embodiment, it may be possible to reduce the consumption electric power of the vehicle communication device 1 and the heat generation amount. Since the narrow area dedicated vehicle does not exist in the vicinity, the wireless base station 2 pauses the narrow area periodic transmission process of the vehicle communication device 1. Thereby, it may be possible to prevent a situation where the narrow area dedicated vehicle cannot receive the vehicle information of the both function mounted vehicle from occurring.

When the narrow area dedicated vehicle exists in the charge cell 3, the wireless base station 2 transmits only the wide area pause instruction signal to the transmission source vehicle as the process in S103 or S105 as described in the embodiment. In addition, the wireless base station 2 does not execute S304 when the narrow area dedicated vehicle exists in the charge cell 3.

When the narrow area dedicated vehicle exists in the charge cell 3, the wireless base station 2 causes the vehicle communication device 1 to continue the narrow area periodic transmission process. In other words, a measure of pausing the narrow area periodic transmission process is not used. Thereby, it may be possible to reduce the risk that the narrow area dedicated vehicle cannot receive the vehicle information of the both function mounted vehicle.

The inter-vehicle communication system 100 of the second embodiment assumes a time when the inter-vehicle communication by the wide area direct communication has become popular. As a flow of practical application and popularization of the inter-vehicle communication technology, it is expected that inter-vehicle communication by the wide area direct communication will become popular after the inter-vehicle communication by the narrow area communication becomes popular. Therefore, at the timing when the inter-vehicle communication by the wide area direct communication begins to become popular, it is expected that the narrow area dedicated vehicle and the both function mounted vehicle coexist on the road.

According to the configuration described in the embodiment or the first modification, the wireless base station 2 cannot determine whether the narrow area dedicated vehicle exists in the charge cell 3 since the narrow area dedicated vehicle cannot directly transmit the VSR to the wireless base station 2. As the result, the wireless base station 2 cannot determine whether to transmit the narrow area pause instruction signal to the vehicle communication device 1. This is because the narrow area dedicated vehicle may not be able to recognize the existence of the both function mounted vehicle when the narrow area pause instruction signal is transmitted to the vehicle communication device 1 in the situation where the narrow area dedicated vehicle exists.

According to the configuration of the second embodiment for such a difficulty, the vehicle communication device 1 reports to the wireless base station 2 whether the narrow area dedicated vehicle exists around the transmission source vehicle based on the reception situation of the vehicle information by the narrow area communication. Thereby, the wireless base station 2 can determine whether the narrow area dedicated vehicle exists in the charge cell 3. As the result, it becomes possible to appropriately select the control aspect of the vehicle communication device 1 depending on whether the narrow area dedicated vehicle exists in the charge cell 3.

When receiving the vehicle information packet indicating that the transmission source vehicle has only the narrow area communication function, the vehicle communication device 1 may transfer the vehicle information packet from the narrow area dedicated vehicle to the wireless base station 2. According to the aspect of transferring the vehicle information of the narrow area dedicated vehicle to the wireless base station 2, it may be possible to grasp the position coordinate and the traveling direction pf the narrow area dedicated vehicle. As the result, after the possibility that the vehicle communication device 1 encounters the narrow area dedicated vehicle is determined by the similar measure to S104, the instruction of the operation mode of the vehicle communication device 1 can be provided.

(Third Modification)

In the second embodiment, the vehicle communication device 1 determines whether the narrow area dedicated vehicle exists around the own device by using the mounted function information of the vehicle information packet received by the narrow area communication, and reports the determination result to the wireless base station 2. Thereby, the wireless base station 2 can manage whether the narrow area dedicated vehicle exists in the charge cell 3.

However, the configuration for the wireless base station 2 to determine whether the narrow area dedicated vehicle exists in the charge cell 3 is not limited to this. For example, the vehicle communication device 1 may transfer the vehicle information packet received by the narrow area communication to the wireless base station 2. According to such a configuration, the wireless base station 2 can acquire information (for example, vehicle ID) of the vehicle performing the narrow area communication. Since the narrow area dedicated vehicle cannot transmit the VSR, the vehicle ID of the narrow area dedicated vehicle is not registered in the management DB 22. Therefore, the wireless base station 2 can detect that the narrow area dedicated vehicle exists in the charge cell 3 based on the vehicle information packet of the vehicle ID that is not registered in the management DB 22. The configuration of the present modification also achieves the same effects as those of the second embodiment.

(Fourth Modification)

The second embodiment may be implemented in combination with the first modification and the second modification of the first embodiment. For example, as shown in FIG. 15, the wireless base station 2 may periodically transmit the vehicle information, may not periodically transmit the vehicle information, and may select the transmission measure based on whether there is the possibility that the transmission source vehicle encounters the different vehicle including the narrow area dedicated vehicle, whether the narrow area communication quality is good, whether the communication quality of the wide area direct communication is good, whether the different vehicle having the encounter possibility includes the narrow area dedicated vehicle, or the like. The transmission measure of the vehicle information corresponds to a communication method for transmitting the vehicle information. FIG. 15 shows an example of a case where the vehicle communication device 1 can employ the narrow area communication, the wide area direct communication, and the inter-vehicle communication as the transmission measure of the vehicle information. The wireless base station 2 controls the operation of the vehicle communication device 1 so that the narrow area dedicated vehicle can acquire the vehicle information of the both function mounted vehicle, while reducing the current consumption of the vehicle communication device 1 depending on an environment around the vehicle communication device 1.

A case of "there is no possibility of encountering different vehicle" in FIG. 15 may include a case where only the transmission source vehicle exists in the charge cell 3 in addition to a case where there is no encountering possibility at the present time due to the position relationship of multiple vehicles in a situation where the multiple vehicle exist. Here, the different vehicle can include the narrow area dedicated vehicle.

Means and/or functions provided by the vehicle communication device 1 may be provided by software recorded in a substantive memory device and a computer that can execute the software, software only, hardware only, or some combination of them. Part or all of the functions of the vehicle communication device 1 may be implemented as hardware. A configuration in which a certain function is realized as hardware includes a configuration in which the function is realized by use of one or more ICs or the like. For example, when a part of the functions or all of the functions of the vehicle communication device 1 is provided by an electronic circuit being hardware, it may be possible to provide it by a digital circuit including multiple logic circuits or analog circuits. In addition, the vehicle communication device 1 may be provided by one computer, or a set of computer resources linked via a data communication device. The similar applies to the base station controller 23

It is noted that a flowchart or the process of the flowchart in the present disclosure includes multiple steps (also referred to as sections), each of which is represented, for instance, as S101. Further, each step can be divided into several sub-steps while several steps can be combined into a single step.

In the above, the embodiment, the configuration, and the aspect of the inter-vehicle communication system and the vehicle communication device according to the present disclosure are exemplified. However, the present disclosure is not limited to every embodiment, every configuration and every aspect related to the present disclosure that are exemplified. For example, embodiments, configurations, and aspects obtained from an appropriate combination of technical elements disclosed in different embodiments, configurations, and aspects are also included within the scope of the embodiments, configurations, and aspects of the present disclosure.

The invention claimed is:

1. An inter-vehicle communication system comprising:
   a plurality of vehicle communication devices for a plurality of vehicles; and
   a wireless base station configured to provide a communication service complying with a wide area wireless communication standard that is predetermined,
   wherein:
   each of the plurality of vehicle communication devices includes
      a vehicle information acquisition portion configured to sequentially acquire vehicle information that
      is information indicating a traveling situation of an own vehicle that is a vehicle including at least one of the plurality of vehicle communication devices and includes a current position information,
   a wide area communication portion that
      is a communication module for performing wireless communication complying with the wide area wireless communication standard and is configured to directly communicate with a different device or communicate with the different device via the wireless base station,
a wide area communication control portion configured to
control an operation of the wide area communication portion and
execute a wide area periodic transmission process that is a process of periodically multicasting a vehicle information packet that is a communication packet indicating the vehicle information towards a different vehicle existing around the own vehicle in cooperation with the wide area communication portion,
a narrow area communication portion configured to perform a narrow area communication that is a wireless communication complying with a predetermined communication method different from the wide area wireless communication standard, and
a narrow area communication control portion configured to
control an operation of the narrow area communication portion and
execute a narrow area periodic transmission process that is a process of periodically multicasting the vehicle information packet towards the different vehicle existing around the own vehicle in cooperation with the narrow area communication portion,
the wide area communication control portion includes a report process portion configured to sequentially transmit a vehicle status report to the wireless base station in cooperation with the wide area communication portion;
the vehicle status report is a signal indicating own vehicle position information acquired by the vehicle information acquisition portion;
the wide area communication control portion is configured to pause the wide area periodic transmission process based on an instruction from the wireless base station; and
the wireless base station includes
a base station communication portion configured to receive the vehicle status report transmitted from the plurality of vehicle communication devices,
an in-cell vehicle management portion configured to manage position information of a vehicle existing in a charge cell that is an area where the wireless base station provides the communication service, based on the vehicle status report received by the base station communication portion,
an encounter determination portion configured to determine whether a transmission source vehicle as a vehicle using a vehicle communication device transmitting the vehicle status report has a possibility of encountering the different vehicle based on the position information that is managed by the in-cell vehicle management portion and position information of the vehicle existing in the charge cell, when the vehicle status report is received, and
a device control portion configured to instruct a transmission source device as the plurality of vehicle communication devices for the transmission source vehicle to pause the wide area periodic transmission process when the encounter determination portion determines that the transmission source vehicle does not have the possibility of encountering the different vehicle.

2. The inter-vehicle communication system according to claim 1, wherein:
the wide area communication portion is configured to directly and wirelessly communicate with the different device that is a different vehicle communication device among the plurality of vehicle communication devices by a communication method complying with the wide area wireless communication standard;
in the wide area periodic transmission process, the wide area communication control portion is configured to periodically multicast the vehicle information by a wide area direct communication that is a direct wireless communication with the different device; and
the wide area direct communication complies with the wide area wireless communication standard.

3. The inter-vehicle communication system according to claim 2, wherein:
when a vehicle other than the transmission source vehicle in the charge cell does not exist, the encounter determination portion determines that the transmission source vehicle does not have the possibility of encountering the different vehicle; and
the device control portion is configured to instruct the transmission source device to pause the wide area periodic transmission process based on a determination result of the encounter determination portion.

4. The inter-vehicle communication system according to claim 2, wherein:
the vehicle information acquisition portion is configured to acquire an own vehicle advancing direction;
the report process portion is configured to transmit a signal including the own vehicle advancing direction acquired by the vehicle information acquisition portion and an own vehicle current position; and
the encounter determination portion is configured to determine whether thee transmission source vehicle encounters the different vehicle based on a current position of the transmission source vehicle, an advancing direction of the transmission source vehicle, a current position of the different vehicle, and a traveling direction of the different vehicle when at least one different vehicle as a vehicle other than the transmission source vehicle exists in the charge cell.

5. An inter-vehicle communication system according to claim 2, wherein:
the device control portion instructs the transmission source device to pause both of the wide area periodic transmission process and the narrow area periodic transmission process when the encounter determination portion determines that the transmission source vehicle does not have the possibility of encountering the different vehicle.

6. The inter-vehicle communication system according to claim 2, wherein:
each of the plurality of vehicle communication devices includes a narrow area communication quality determination portion configured to sequentially determine a narrow area communication quality that is a quality of the narrow area communication around the own vehicle based on a reception situation of a wireless signal at the narrow area communication portion;
the report process portion is configured to sequentially transmit a signal including a determination result of the narrow area communication quality as the vehicle status report; and the device control portion pauses the wide area periodic transmission process while continuing the narrow area periodic transmission process on a condition that
the encounter determination portion determines that the transmission source vehicle has the possibility of encountering the different vehicle and
the narrow area communication quality around the transmission source device is good.

7. The inter-vehicle communication system according to claim 2, wherein:
each of the plurality of vehicle communication devices includes a wide area direct communication quality determination portion configured to sequentially determine a wide area direct communication quality that is a quality of the wide area direct communication based on a reception situation of a wireless signal at the wide area communication portion;
the report process portion is configured to sequentially transmit a signal including a determination result of the wide area direct communication quality as the vehicle status report; and
the device control portion pauses the narrow area periodic transmission process while continuing the wide area periodic transmission process on a condition that
the encounter determination portion determines that the transmission source vehicle has the possibility of encountering the different vehicle and
the wide area direct communication quality around the transmission source device is good.

8. The inter-vehicle communication system according to claim 2, wherein:
each of the plurality of vehicle communication devices includes a narrow area communication quality determination portion configured to sequentially determine a narrow area communication quality that is a quality of the narrow area communication around the own vehicle based on a reception situation of a wireless signal at the narrow area communication portion;
each of the plurality of vehicle communication devices includes a wide area direct communication quality determination portion configured to sequentially determine a wide area direct communication quality that is a quality of the wide area direct communication based on a reception situation of a wireless signal at the wide area communication portion;
the wide area communication portion is configured to perform an indirect inter-vehicle communication with the different vehicle;
the indirect inter-vehicle communication is an indirect communication via the wireless base station; and
the device control portion instructs the transmission source vehicle to periodically transmit the vehicle information by the indirect inter-vehicle communication on a condition that
the encounter determination portion determines that the transmission source vehicle has the possibility of encountering the different vehicle and
both of the wide area direct communication quality and the narrow area communication quality around the transmission source vehicle are not good.

9. The inter-vehicle communication system according to claim 2, further comprising:
in addition to the plurality of vehicle communication devices and the wireless base station,
a wide area communication non-compliant device that is a communication device that
has a function of performing the narrow area communication and
does not have a function of performing the wide area direct communication,
wherein:
the wireless base station does not instruct the transmission source device to pause the narrow area periodic transmission process when the wide area communication non-compliant device exists in the charge cell.

10. The inter-vehicle communication system according to claim 9, wherein:
the wide area communication non-compliant device is configured to periodically transmit the vehicle information packet including information indicating that an own device does not have a function of performing the wide area direct communication;
based on a content of the vehicle information packet that is received, each of the plurality of vehicle communication devices determines whether a transmission source of the vehicle information packet is the wide area communication non-compliant device; and
when the vehicle information packet is received from the wide area communication non-compliant device, the report process portion reports existence of the wide area communication non-compliant device and the vehicle information of the wide area communication non-compliant device to the wireless base station.

11. A vehicle communication device for a vehicle, comprising:
a vehicle information acquisition portion configured to sequentially acquire vehicle information that
is information indicating a traveling situation of the vehicle and
includes a current position information;
a wide area communication portion that
is a communication module for performing wireless communication complying with a predetermined wide area wireless communication standard and
is configured to directly or indirectly provide a communication service complying with the predetermined wireless communication standard with a different device via a wireless base station;
a wide area communication control portion configured to control an operation of the wide area communication portion and
execute a wide area periodic transmission process that is a process of periodically multicasting a vehicle information packet that is a communication packet indicating the vehicle information towards a different vehicle existing around an own vehicle in cooperation with the wide area communication portion;
a narrow area communication portion configured to perform a narrow area communication that is a wireless communication complying with a predetermined communication method different from the predetermined wide area wireless communication standard; and
a narrow area communication control portion configured to
control an operation of the narrow area communication portion and
execute a narrow area periodic transmission process that is a process of periodically multicasting the vehicle information packet towards the different vehicle existing around the own vehicle in cooperation with the narrow area communication portion,
wherein:

the wide area communication control portion includes a report process portion configured to sequentially transmit a vehicle status report to the wireless base station in cooperation with the wide area communication portion;

the vehicle status report is a signal indicating own vehicle position information acquired by the vehicle information acquisition portion; and the wide area communication control portion is configured to pause the wide area periodic transmission process based on an instruction from the wireless base station when the wireless base station determines that the transmission source vehicle does not have the possibility of encountering the different vehicle and instructs the wide area communication control portion to pause the wide area periodic transmission process.

12. The inter-vehicle communication system according to claim 1, wherein:
a process of multicasting the vehicle information packet is a process of transmitting a vehicle information packet similar to the vehicle information packet to the at least one different vehicle.

13. The inter-vehicle communication system according to claim 1, wherein:
a communication distance of the wide area periodic transmission process is longer than a communication distance of the narrow area periodic transmission process.

14. The inter-vehicle communication system according to claim 6, wherein:
the narrow area communication quality determination portion is configured to determine the narrow area communication quality based on a predetermined index value including at least one of a reception electric power of a narrow area vehicle information packet transmitted from the different vehicle, a signal-to-noise ratio, a packet loss rate, or a carrier congestion degree; and the wide area direct communication quality determination portion is configured to determine the wide area direct communication quality based on a predetermined index value including at least one of a reception electric power of a wide area vehicle information packet transmitted from the different vehicle, a signal-to-noise ratio, a packet loss rate, or a carrier congestion degree.

15. An inter-vehicle communication system comprising:
a plurality of vehicle communication devices for a plurality of vehicles; and
a wireless base station configured to provide a communication service complying with a wide area wireless communication standard that is predetermined,
wherein:
each of the plurality of vehicle communication devices includes a first processor configured to
sequentially acquire vehicle information that is information indicating a traveling situation of an own vehicle that is a vehicle including at least one of the plurality of vehicle communication devices and
includes a current position information,
perform wireless communication complying with the wide area wireless communication standard,
directly communicate with a different device or communicate with the different device via the wireless base station,
execute a wide area periodic transmission process that is a process of periodically multicasting a vehicle information packet that is a communication packet indicating the vehicle information towards a different vehicle existing around the own vehicle,
perform a narrow area communication that is a wireless communication complying with a predetermined communication method different from the wide area wireless communication standard,
execute a narrow area periodic transmission process that is a process of periodically multicasting the vehicle information packet towards the different vehicle existing around the own vehicle,
sequentially transmit a vehicle status report to the wireless base station,
pause the wide area periodic transmission process based on an instruction from the wireless base station;

the vehicle status report is a signal indicating own vehicle position information that is acquired; and the wireless base station includes a second processor configured to
receive the vehicle status report transmitted from the vehicle communication device,
manage position information of a vehicle existing in a charge cell that is an area where the wireless base station provides the communication service, based on the vehicle status report that is received,
determine whether a transmission source vehicle as a vehicle using a vehicle communication device transmitting the vehicle status report has a possibility of encountering the different vehicle based on the position information that is managed and position information of the vehicle existing in the charge cell, when the vehicle status report is received, and
instruct a transmission source device as the vehicle communication device for the transmission source vehicle to pause the wide area periodic transmission process when determining that the transmission source vehicle does not have the possibility of encountering the different vehicle.

* * * * *